US012591815B2

(12) United States Patent
Chowdhary et al.

(10) Patent No.: US 12,591,815 B2
(45) Date of Patent: Mar. 31, 2026

(54) METHOD AND SYSTEM FOR UPDATING MACHINE LEARNING BASED CLASSIFIERS FOR RECONFIGURABLE SENSORS

(71) Applicant: STMicroelectronics, Inc., Coppell, TX (US)

(72) Inventors: Mahesh Chowdhary, San Jose, CA (US); Mahaveer Jain, Milpitas, CA (US)

(73) Assignee: STMicroelectronics, Inc., Coppell, TX (US)

( * ) Notice: Subject to any disclaimer, the term of this patent is extended or adjusted under 35 U.S.C. 154(b) by 1047 days.

(21) Appl. No.: 17/321,251

(22) Filed: May 14, 2021

(65) Prior Publication Data

US 2021/0272025 A1    Sep. 2, 2021

Related U.S. Application Data

(63) Continuation-in-part of application No. 16/728,822, filed on Dec. 27, 2019, now abandoned.

(51) Int. Cl.
*G06N 20/20* (2019.01)
*G06N 5/01* (2023.01)

(52) U.S. Cl.
CPC ............... *G06N 20/20* (2019.01); *G06N 5/01* (2023.01)

(58) Field of Classification Search
CPC ............ G06N 20/00; G06N 3/08; G06N 3/02; G06N 3/0464; G06N 3/09; G06N 3/0895;
(Continued)

(56) References Cited

U.S. PATENT DOCUMENTS

| | | |
|---|---|---|
| 9,311,789 B1 | 4/2016 | Gwin |
| 10,022,071 B2 | 7/2018 | Rishi et al. |

(Continued)

FOREIGN PATENT DOCUMENTS

RU    2702980 C1    10/2019

OTHER PUBLICATIONS

Zhou et al., "Edge Intelligence: Paving the Last Mile of Artificial Intelligence with Edge Computing," arXiv (May 2019) (Year: 2019).*

(Continued)

*Primary Examiner* — Kakali Chaki
*Assistant Examiner* — Kevin L. Smith
(74) *Attorney, Agent, or Firm* — Seed Intellectual Property Law Group LLP

(57) ABSTRACT

A sensor management system includes a cloud-based sensor configuration system and an electronic device. The electronic device includes a sensor unit. The sensor unit includes configuration data that controls operation of the sensor unit. The configuration data includes a classifier that classifies feature sets generated from sensor signals of the sensor unit. The electronic device sends sensor data to the cloud-based sensor configuration system. The cloud-based sensor configuration system analyzes the sensor data and generates a new classifier customized for the sensor unit based on the sensor data. The cloud-based sensor configuration system sends the new classifier to the electronic device. The electronic device replaces the classifier in the sensor unit with the new classifier.

20 Claims, 12 Drawing Sheets

(58) Field of Classification Search
CPC ........ G06N 3/091; G06N 3/092; G06N 3/094;
G06N 3/096; G06N 3/098; G06N 3/0985;
G06N 3/04; G06N 3/0475; G06N 3/0495;
G06N 3/0499; G06F 18/24; G06F 18/214;
G06F 18/24323
See application file for complete search history.

(56)                     References Cited

U.S. PATENT DOCUMENTS

| | | | |
|---|---|---|---|
| 10,142,789 | B2 | 11/2018 | Chowdhary et al. |
| 10,235,762 | B1* | 3/2019 | Wylie ................... G06V 20/52 |
| 10,260,877 | B2 | 4/2019 | Chowdhary et al. |
| 10,452,994 | B2 | 10/2019 | Duesterwald et al. |
| 11,584,020 | B2 | 2/2023 | Huang et al. |
| 2012/0068953 | A1* | 3/2012 | Chang ................. G01R 27/2605 |
| | | | 345/173 |
| 2014/0188781 | A1* | 7/2014 | Fawaz .................... G06N 5/025 |
| | | | 706/59 |
| 2014/0237595 | A1* | 8/2014 | Sridhara ............... G06F 21/566 |
| | | | 709/224 |
| 2014/0359626 | A1* | 12/2014 | Guedalia ................ G06N 5/043 |
| | | | 718/101 |
| 2015/0161386 | A1 | 6/2015 | Gupta et al. |
| 2015/0286820 | A1 | 10/2015 | Sridhara et al. |
| 2016/0110657 | A1 | 4/2016 | Gibiansky et al. |
| 2017/0024660 | A1* | 1/2017 | Chen ..................... G06N 5/045 |
| 2017/0060574 | A1* | 3/2017 | Malladi ................... H04W 4/70 |
| 2017/0124466 | A1 | 5/2017 | Li et al. |
| 2017/0290531 | A1* | 10/2017 | Kamath ............. A61B 5/14865 |
| 2018/0139227 | A1* | 5/2018 | Martin ................ H04L 63/1433 |
| 2018/0198821 | A1 | 7/2018 | Gopalakrishna |
| 2018/0247194 | A1* | 8/2018 | Plebani .................... G06N 3/08 |
| 2018/0285767 | A1 | 10/2018 | Chew |
| 2018/0306609 | A1* | 10/2018 | Agarwal ................ G06N 20/10 |
| 2019/0121350 | A1 | 4/2019 | Cella et al. |
| 2019/0188846 | A1 | 6/2019 | Tamai |
| 2019/0388728 | A1 | 12/2019 | Wang et al. |
| 2020/0117950 | A1* | 4/2020 | Thompson .......... B60W 60/001 |
| 2020/0145492 | A1* | 5/2020 | Slik ..................... G06F 11/1004 |
| 2020/0278665 | A1* | 9/2020 | Arditti Ilitzky ......... G06F 17/16 |

OTHER PUBLICATIONS

Kim et al., "An edge cloud-based body data sensing architecture for artificial intelligence computation," Int'l J. of Distributed Sensor Networks (Feb. 2019) (Year: 2019).*
Gupchup et al., "Model-Based Event Detection in Wireless Sensor Networks," arXiv (2009) (Year: 2009).*
George et al., "Inertial Navigation Aided by Monocular Camera Observations of Unknown Features," IEEE Int'l Conference on Robotics & Automation (2007) (Year: 2007).*
Daniele et al., "Reconfigurable Sensor Systems Integrated with Artificial Intelligence and Data Harnessing to Enable Personalized Medicine," NSF Workshop (March 2019) (Year: 2019).
Navalgund et al., "Design, Development and Implementation of ALU, RAM and ROM for 8051 Microcontroller on FPGA using VHDL," IJCA (2013) (Year: 2013).
The Authoritative Dictionary of IEEE Standards Terms (2000), at p. 1240 ("update") (Year: 2000).
The Authoritative Dictionary of IEEE Standards Terms (2000), at p. 778 ("output") (Year: 2000).
Witten et al., "The WEKA Workbench—Online Appendix for Data Mining: Practical Machine Learning Tools and Techniques," URL= https://www.cs.waikato.ac.nz/ml/weka/Witten_et_al_2016_appendix. pdf>, downloaded Jul. 8, 2022. (128 pages).

* cited by examiner

ELECTRONIC DEVICE ~102

SENSOR MANAGER ~158

CLOUD COMMUNICATION INTERFACE ~156

SENSOR UNIT ~104

USER INTERFACE DEVICES ~160

USER APPICATIONS ~162

TRANSCEIVER ~164

PROCESSING RESOURCES ~166

MEMORY RESOURCES ~168

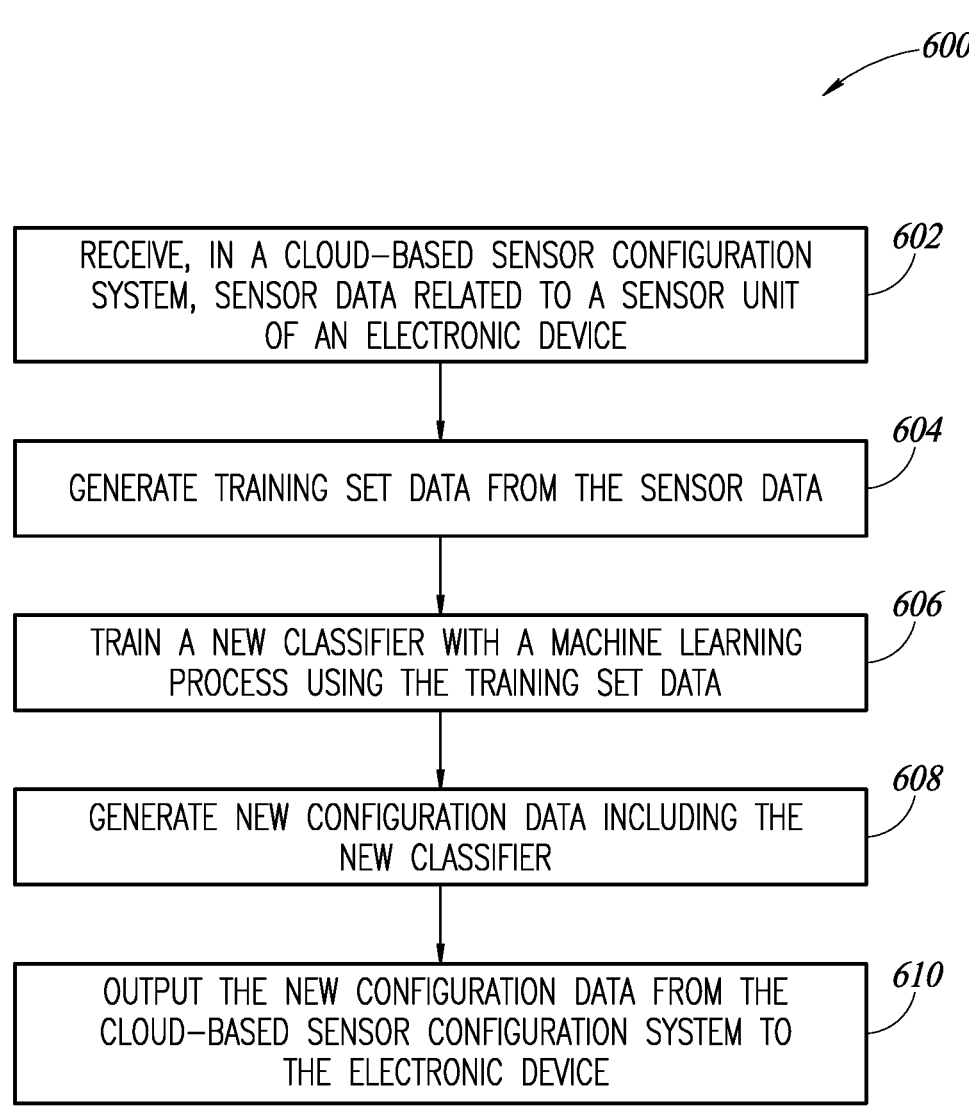

*600*

RECEIVE, IN A CLOUD–BASED SENSOR CONFIGURATION SYSTEM, SENSOR DATA RELATED TO A SENSOR UNIT OF AN ELECTRONIC DEVICE    *602*

GENERATE TRAINING SET DATA FROM THE SENSOR DATA    *604*

TRAIN A NEW CLASSIFIER WITH A MACHINE LEARNING PROCESS USING THE TRAINING SET DATA    *606*

GENERATE NEW CONFIGURATION DATA INCLUDING THE NEW CLASSIFIER    *608*

OUTPUT THE NEW CONFIGURATION DATA FROM THE CLOUD–BASED SENSOR CONFIGURATION SYSTEM TO THE ELECTRONIC DEVICE    *610*

FIG. 6

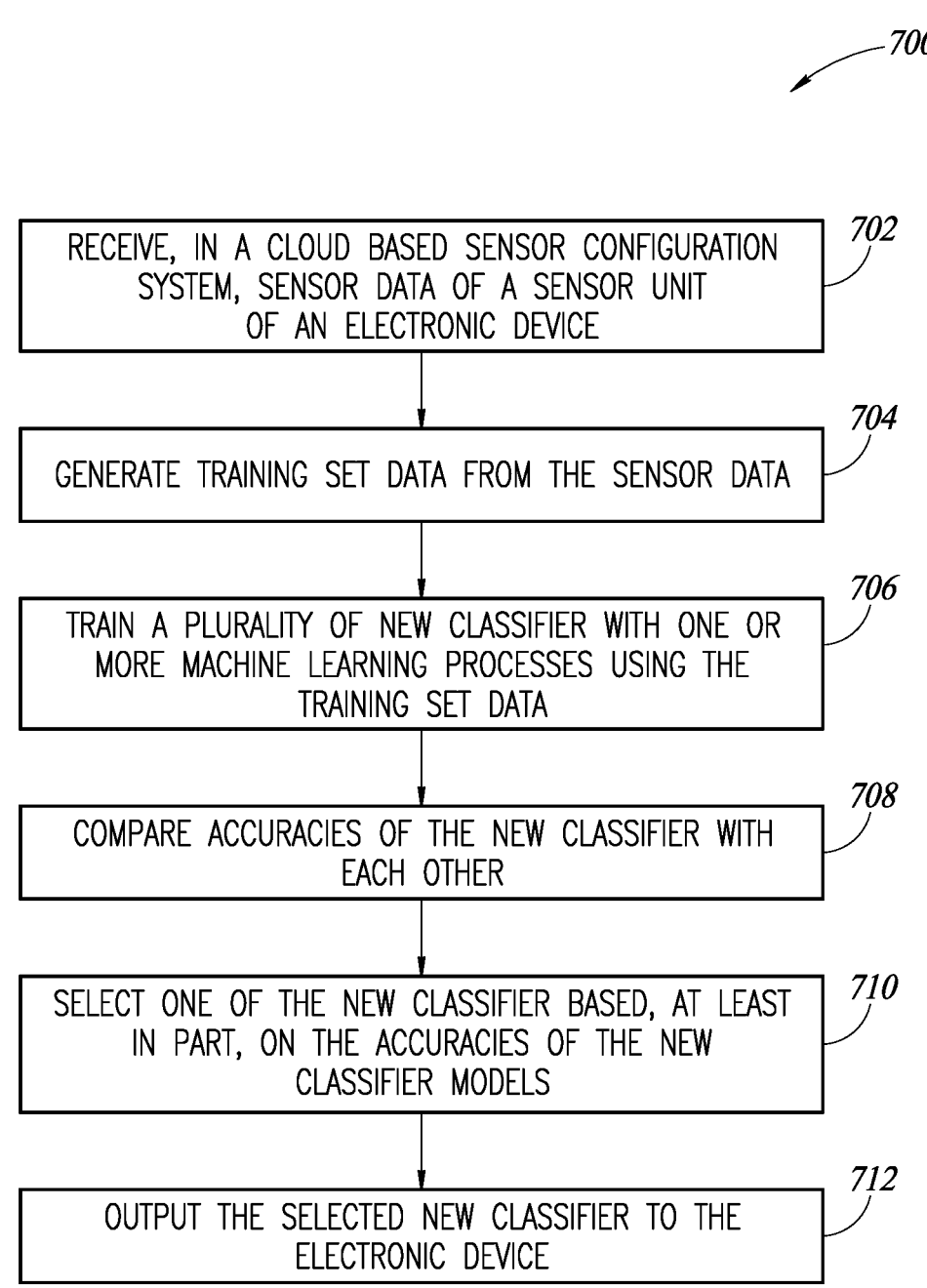

*700*

*702*

RECEIVE, IN A CLOUD BASED SENSOR CONFIGURATION SYSTEM, SENSOR DATA OF A SENSOR UNIT OF AN ELECTRONIC DEVICE

*704*

GENERATE TRAINING SET DATA FROM THE SENSOR DATA

*706*

TRAIN A PLURALITY OF NEW CLASSIFIER WITH ONE OR MORE MACHINE LEARNING PROCESSES USING THE TRAINING SET DATA

*708*

COMPARE ACCURACIES OF THE NEW CLASSIFIER WITH EACH OTHER

*710*

SELECT ONE OF THE NEW CLASSIFIER BASED, AT LEAST IN PART, ON THE ACCURACIES OF THE NEW CLASSIFIER MODELS

*712*

OUTPUT THE SELECTED NEW CLASSIFIER TO THE ELECTRONIC DEVICE

FIG. 7

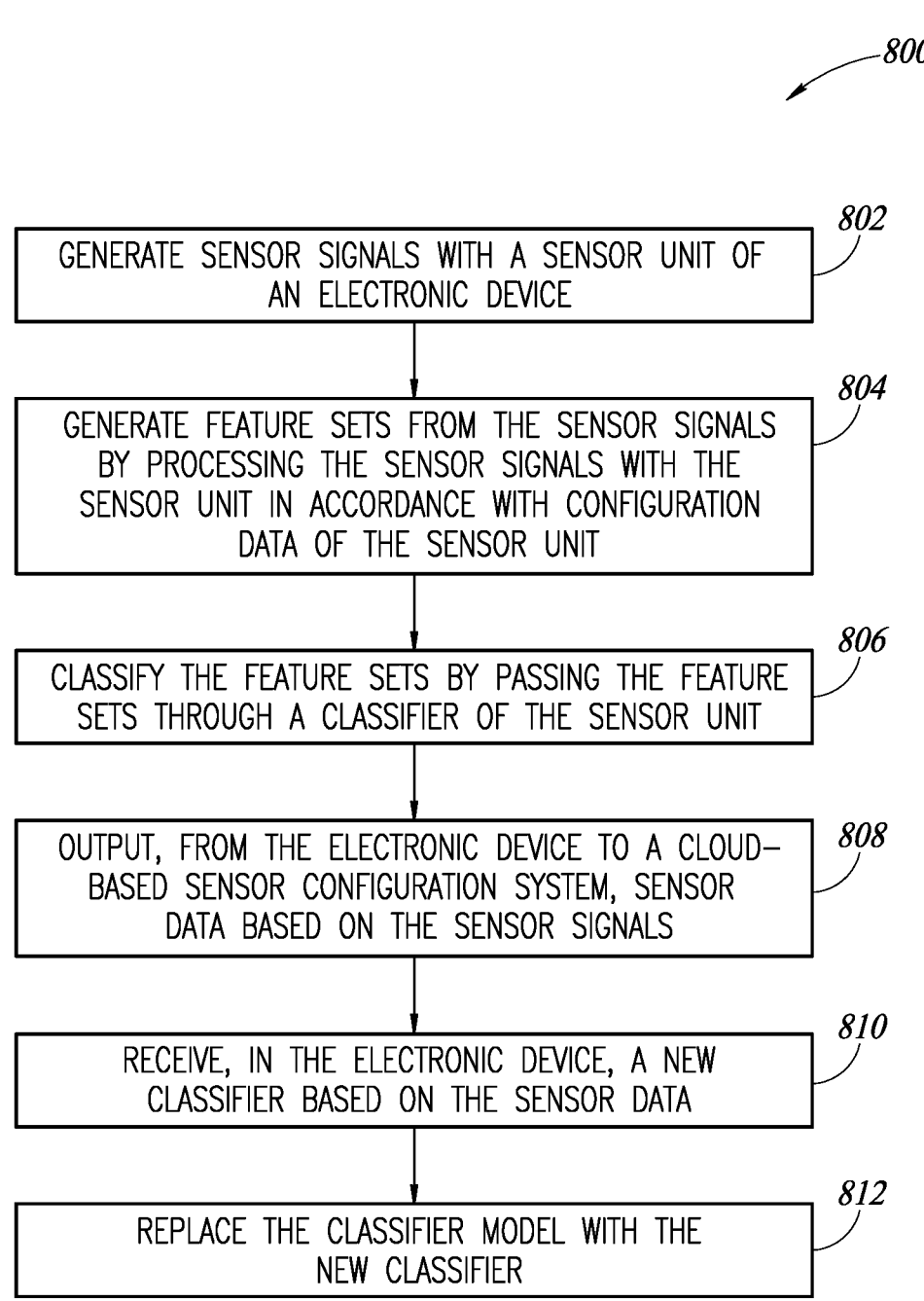

*800*

*802* GENERATE SENSOR SIGNALS WITH A SENSOR UNIT OF AN ELECTRONIC DEVICE

*804* GENERATE FEATURE SETS FROM THE SENSOR SIGNALS BY PROCESSING THE SENSOR SIGNALS WITH THE SENSOR UNIT IN ACCORDANCE WITH CONFIGURATION DATA OF THE SENSOR UNIT

*806* CLASSIFY THE FEATURE SETS BY PASSING THE FEATURE SETS THROUGH A CLASSIFIER OF THE SENSOR UNIT

*808* OUTPUT, FROM THE ELECTRONIC DEVICE TO A CLOUD-BASED SENSOR CONFIGURATION SYSTEM, SENSOR DATA BASED ON THE SENSOR SIGNALS

*810* RECEIVE, IN THE ELECTRONIC DEVICE, A NEW CLASSIFIER BASED ON THE SENSOR DATA

*812* REPLACE THE CLASSIFIER MODEL WITH THE NEW CLASSIFIER

FIG. 8

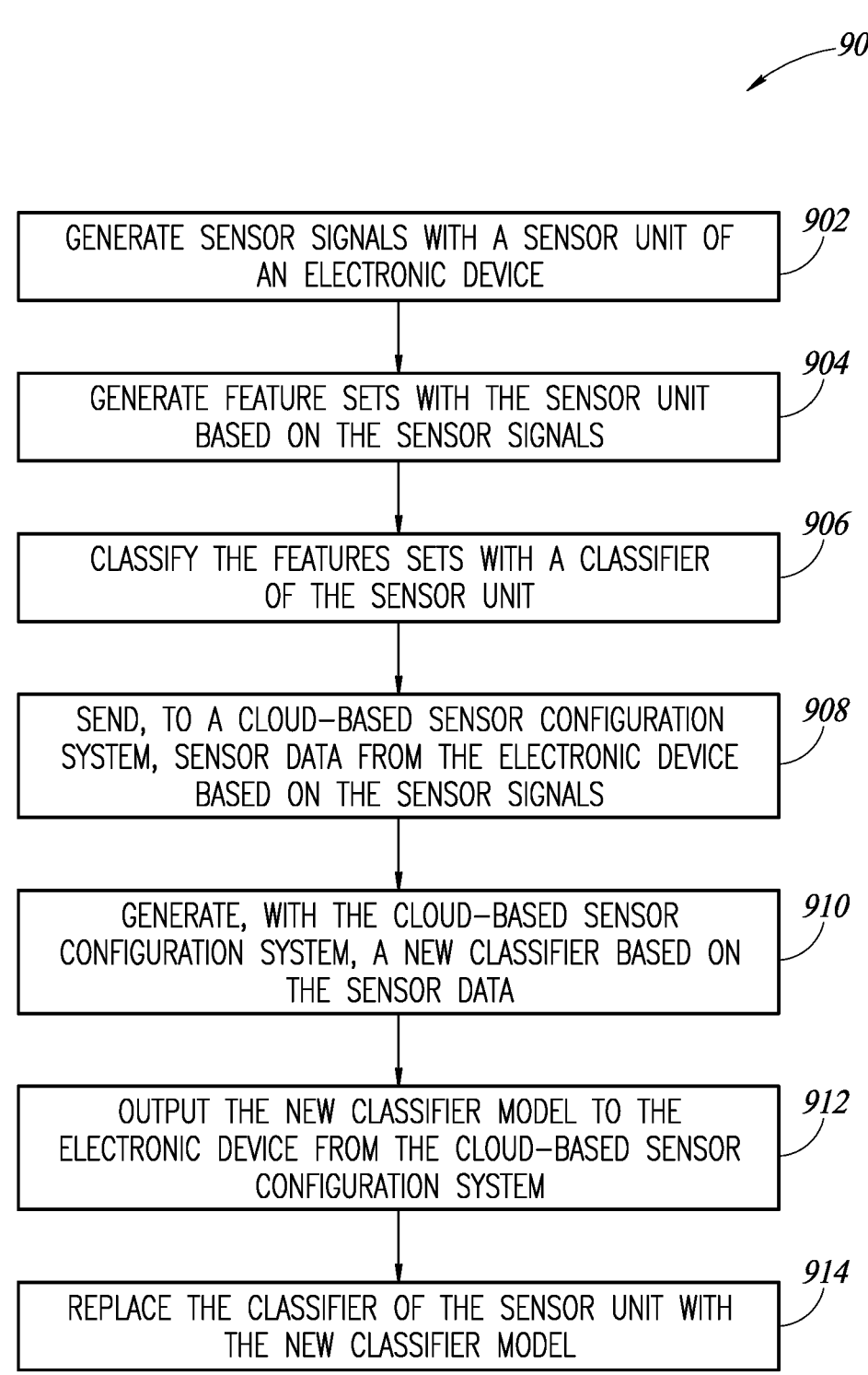

*900*

GENERATE SENSOR SIGNALS WITH A SENSOR UNIT OF AN ELECTRONIC DEVICE   *902*

GENERATE FEATURE SETS WITH THE SENSOR UNIT BASED ON THE SENSOR SIGNALS   *904*

CLASSIFY THE FEATURES SETS WITH A CLASSIFIER OF THE SENSOR UNIT   *906*

SEND, TO A CLOUD-BASED SENSOR CONFIGURATION SYSTEM, SENSOR DATA FROM THE ELECTRONIC DEVICE BASED ON THE SENSOR SIGNALS   *908*

GENERATE, WITH THE CLOUD-BASED SENSOR CONFIGURATION SYSTEM, A NEW CLASSIFIER BASED ON THE SENSOR DATA   *910*

OUTPUT THE NEW CLASSIFIER MODEL TO THE ELECTRONIC DEVICE FROM THE CLOUD-BASED SENSOR CONFIGURATION SYSTEM   *912*

REPLACE THE CLASSIFIER OF THE SENSOR UNIT WITH THE NEW CLASSIFIER MODEL   *914*

FIG. 9

METHOD AND SYSTEM FOR UPDATING MACHINE LEARNING BASED CLASSIFIERS FOR RECONFIGURABLE SENSORS

CROSS-REFERENCE TO RELATED APPLICATION

The present application is a continuation-in-part of U.S. patent application Ser. No. 16/728,822, filed on Dec. 27, 2019, titled METHOD AND SYSTEM FOR GENERATING MACHINE LEARNING BASED CLASSIFIERS FOR RECONFIGURABLE SENSOR. U.S. patent application Ser. No. 16/728,822 is incorporated by reference herein in its entirety.

BACKGROUND

Technical Field

The present disclosure relates to the field of sensors for electronic devices. The present disclosure relates more particularly to sensors that include analysis models.

Description of the Related Art

Many electronic devices include sensor units that sense parameters associated with the use of electronic devices. Typically, the configuration settings of the sensor unit are established before the electronic device is put to use in its intended use. Accordingly, the configuration settings of the sensor unit are configured for the typical use case but not tailored to the circumstances of the electronic device or the habits of users that use the electronic device.

BRIEF SUMMARY

One embodiment is a sensor management system. The sensor management system includes an electronic device and a cloud-based sensor configuration system. The electronic device includes a sensor unit. The sensor unit includes configuration data that controls the function and machine learning core of the sensor unit. After the electronic device and the sensor unit have been in use, the electronic device outputs sensor data or feature sets to the cloud-based sensor configuration system. The sensor configuration system analyzes the sensor data or feature sets and generates new configuration data customized for the sensor unit based on the input data. The sensor configuration system sends the new configuration data to the electronic device. The electronic device updates the configuration data of the sensor unit with the new customized configuration data.

BRIEF DESCRIPTION OF THE SEVERAL VIEWS OF THE DRAWINGS

FIG. 6 is a flow diagram of a method for managing a sensor unit, according to one embodiment.

FIG. 7 is a flow diagram of a method for managing a sensor unit, according to one embodiment.

FIG. 8 is a flow diagram of a method for managing a sensor unit, according to one embodiment.

FIG. 9 is a flow diagram of a method for managing a sensor unit, according to one embodiment.

DETAILED DESCRIPTION

Figures 1, 2:
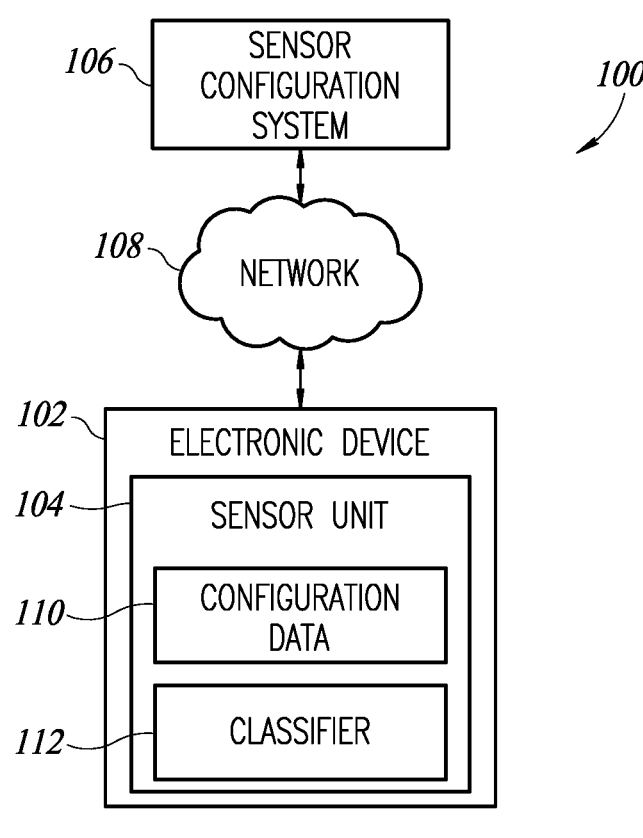
FIG. 1 is a block diagram of a sensor management system, according to one embodiment.
FIG. 2 is a block diagram of a classifier, according to one embodiment.

FIG. 1 is a block diagram of a sensor management system 100, according to one embodiment. The sensor management system 100 includes an electronic device 102 and a sensor configuration system 106. The electronic device 102 and the sensor configuration system 106 are communicatively coupled by a network 108. The electronic device 102 includes a sensor unit 104. The sensor configuration system 106 and the electronic device 102 cooperate to update a configuration of the sensor unit 104.

The sensor unit 104 generates sensor signals related to a context or activity of the electronic device 102. The sensor unit 104 generates feature data from the sensor signals by processing the sensor signals. The sensor unit 104 classifies an action or context of the electronic device 102 based on the feature data and the configured machine learning model.

The sensor unit 104 includes configuration data 110. The configuration data 110 defines a configuration of the sensor unit 104. The configuration data 110 controls various operational aspects of the sensor unit 104. The operational aspects can include, but are not limited to, sampling rates for sampling sensor signals, filter parameters for filtering the sensor signals, formulas for computing feature data from the sensor signals, running machine learning core logic, and other operational aspects of the sensor unit 104.

The sensor unit 104 also includes a classifier 112. The classifier 112 receives the feature data for the various computed features. The classifier 112 generates classification data that classifies a context of the electronic device 102 based on the feature data. The configuration data 110 can include the configuration of the classifier 112. Further details regarding some example contexts are given below.

In one embodiment, the electronic device 102 is a personal electronic device of a user. The personal electronic device can include a smart phone, a smart watch, or another type of electronic device commonly carried, or worn by a user or used in an industrial application such as predictive maintenance. In this case, the sensor unit 104 may include motion sensors such as an accelerometer and a gyroscope. The accelerometer senses linear acceleration of the personal electronic device 102 in one or more axes. The gyroscope senses angular or rotational motion of the electronic device 102 for one or more rotational axes. The accelerometer and the gyroscope output sensor signals indicative of the acceleration and angular motion for the various axes.

The sensor unit 104 generates feature data from the sensor signals. The feature data can include average acceleration for each of a plurality of axes, mean normal acceleration, instantaneous angular velocity for each of a plurality of rotational axes, a mean angle, a number of zero crossings, a peak to peak range of acceleration, a peak to peak range of angular motion, a peak to peak range of mean normal acceleration, a peak to peak range of mean normal angular motion, average long-term acceleration, average long term angular motion, energy values, numbers of zero crossings, intensity of motion for each of the various axes, a total intensity, or other types of features that can be computed based on filtered or raw acceleration and angular motion sensor signals. The configuration data 110 determines which features will be calculated from the sensor signals and how those features will be calculated.

The classifier 112 is a model that is configured to receive, as input, certain of the calculated features. The classifier 112 is configured to generate a classification for the context of the personal electronic device based on the values of the features. The classifier 112 includes one or more classification algorithms that expect as input the selected features and that classify the context of the personal electronic device into one of a fixed number of possible classifications.

The contexts can include various ways that the personal electronic device 102 can be carried, including, but not limited to, in a pocket, in a hand, on a left wrist, on a right wrist, strapped to an arm, or other ways that the personal electronic device can be carried or worn. The context can include various types of exercises that can be performed by a user while carrying or wearing the personal electronic device, including, but not limited to, walking outdoors, jogging outdoors, street biking, mountain biking, climbing stairs, running on a treadmill, riding a stationary bicycle, swimming, rowing, weightlifting, or other types of exercise. The contexts can also include various types of transportation including whether the user is driving a car, riding in a car, riding in a bus, riding on a train, riding on an airplane, or other types of transportation. The contexts can include various movements of the electronic device 102 such as raising the electronic device 102 to view a display of the electronic device 102, double-tapping a touch sensitive display, rotating the electronic device 102 clockwise or counterclockwise, swiping the touch sensitive display in various directions, setting the electronic device 102 face-down, setting the electronic device face up, or other types of motions or gestures that can be made in relation to the personal electronic device 102. The electronic device may also be a vehicle or industrial machine. The classifier can identify contexts relevant to the electronic device for predictive maintenance or other industrial purposes.

In one embodiment, the classifier 112 may initially correspond to a standard classifier that comes standard with the personal electronic device 102. In this case, the classifier 112 may initially not be very accurate because it is not generated based on the personal movements, habits, or other characteristics of the user. The classifier 112 may misclassify exercise, transportation, or gestures made by the user with the personal electronic device because the user may not move or use the electronic device 102 in ways that align with an initial configuration or training of the classifier 112. The failure to properly classify contexts of the personal electronic device 102 can have an adverse impact on the satisfaction of the user with the electronic device. In another embodiment, electronic device 102 could be a standard predictive maintenance classification module with a standard configuration for a rotating machine such as motor or pump. In this case, classifier 112, would not classify anomaly or normal operation detection for specific machine correctly.

The sensor management system 100 utilizes the sensor configuration system 106 to update the configuration data 110 of the sensor unit 104. In particular, the sensor configuration system 106 generates configuration data 110 that is customized to the electronic device 102 based on data obtained from the sensor unit 104. Customized configuration data is then pushed down to and configured in the sensor unit 104.

The electronic device 102 communicates with the sensor unit 104 and with the sensor configuration system 106. The electronic device 102 receives data from the sensor unit 104. The electronic device 102 processes the data received from the sensor unit 104 and sends it to the sensor configuration system 106 via the network 108. The sensor configuration system 106 can then generate customized configuration data 110 including a customized classifier 112 based on the data received from the electronic device 102, as will be described in more detail below.

In one embodiment, the electronic device 102 receives raw sensor data from the sensor unit 104. The electronic device 102 also receives classification data from the sensor unit 104. The classification data corresponds to how the classifier 112 has previously classified contexts of the electronic device 102. The electronic device 102 can also convert sensor data to feature data before sending to the cloud in order to reduce data traffic. The electronic device 102 also receives interrupts from the sensor unit 104.

In one embodiment, the electronic device 102 generates label data including labels for the raw sensor data or for sets of features from the feature data. The labels correspond to the correct context of the electronic device for a given portion of the raw sensor data. The labels can be used by the sensor configuration system 106 to generate customized configuration data for the sensor unit 104.

In one embodiment, the labels are generated based on user input indicating the contexts for various periods of time. The electronic device 102 may include one or more applications that enables users to specify an activity that they will be performing. For example, a fitness tracking application may enable users to select a type of exercise from a list of exercises prior to beginning a workout. The electronic device 102 can use this exercise selection to label certain portions of the sensor data. In another example, the electronic device may include a navigation application that enables users to select a mode of transportation and then navigates the user to a selected destination based on that mode of transportation. The electronic device 102 can also use interrupts generated by the sensor unit 104 to assist in labeling various activities.

The electronic device 102 sends the sensor data and the label data to the sensor configuration system 106. The electronic device 102 may also send feature data to the sensor configuration system 106 including feature values previously generated by the sensor unit 104 or by the electronic device 102 from the sensor data.

The electronic device sends the sensor data including the label data and the feature data to the sensor configuration system 106 via the network 108. The network 108 can include one or more networks such as the Internet, local area networks, wireless networks, and wired networks. The network 108 can include any combination of networks that enables the electronic device to communicate with the sensor configuration system 106.

After the sensor configuration system 106 receives the various types of data from the electronic device 102, the sensor configuration system 106 analyzes the sensor data and the label data with one or more analysis processes. The sensor configuration system 106 generates updated, customized configuration data 110 for the sensor unit 104 based on the sensor data, the label data and the previous configuration.

In one embodiment, the sensor configuration system generates an updated, customized classifier 112 for the sensor unit 104 based on one or more machine learning processes. The sensor configuration system 106 generates training set data from the sensor data and the labeled data. The sensor configuration system 106 utilizes the training set data to train a new classifier based on the one or more machine learning processes.

In one embodiment, the sensor configuration system 106 generates one or more new classifiers using the training set data and measures the accuracy of each new classifier. The sensor configuration system 106 compares the accuracies of each new classifier to each other and to the classifier currently installed in the sensor unit 104. The sensor configuration system 106 selects the new classifier that has the highest accuracy in generating classifications that match the labels. The sensor configuration system 106 provides the selected new classifier to the electronic device 102 via the network 108. The electronic device 102 then replaces the classifier 112 in the sensor unit 104 with the new classifier selected by the sensor configuration system 106.

The updated classifier is customized based on the data provided by the electronic device 102 to the sensor configuration system 106. The labeled sensor data enables the sensor configuration system 106 to generate a classifier 112 that is customized to the particular electronic device 102 based on the characteristics of the electronic device 102 and the way that the user uses the electronic device 102. The result is that the updated classifier more accurately classifies contexts of the electronic device 102. This can lead to a more satisfying experience of the user with the electronic device 102.

While the description herein discusses embodiments in which the electronic device 102 is a personal electronic device, other types of electronic devices can be utilized without departing from the scope of the present disclosure. For example, the electronic device can be an industrial node including a sensor unit 104. The industrial node uses the sensor unit 104 to monitor the context of industrial equipment. The industrial node outputs sensor data to the sensor configuration system 106. The industrial node receives new configuration data from the sensor configuration system.

FIG. 2 is an illustration of operation of a classifier 112, according to one embodiment. The classifier receives as input, a feature set 116. The classifier 112 processes the feature set 116 with a classifier algorithm or function. The classifier 112 outputs classification data 118. The classification data 118 indicates a classification for the context of the electronic device 102 for the period of time represented by the feature set 116.

The classifier 112 includes an algorithm 120. The algorithm 120 defines a function for classifying contexts of the electronic device 102. The algorithm defines an expected number of inputs. Each input corresponds to a type of feature generated from the sensor signals of the sensor unit 104. In the example of FIG. 2, the algorithm 120 expects N input features.

The feature set 116 includes N rows or data fields. Each row or data field corresponds to a particular type of feature. The number of data fields or rows in the feature set 116 corresponds to the number of inputs expected by classifier 112 as defined by the algorithm 120.

In an example in which the electronic device 102 is a smart phone or a smart watch, the features 1-N can include some of the types of features described above in relation to FIG. 1. Feature 1 may correspond to mean linear acceleration along an X axis, feature 2 may correspond to mean linear acceleration along a Y axis, feature 3 may correspond to mean linear acceleration along a Z axis, feature 4 may correspond to mean angular motion along a first axis of rotation, feature 5 may correspond to maximum angular motion along a second axis of rotation, and so on. The feature set 116 may include feature types other than those described herein without departing from the scope of the present disclosure.

In one embodiment, the feature sets 116 are feature vectors. Each data field of the feature vector corresponds to a particular feature type. Each data field includes a feature value for that feature. Each feature set 116 may include multiple feature vectors each including multiple feature values from a particular period of time.

In one embodiment, the classifier 112 includes decision trees. In this case, the algorithm 120 defines a plurality of decision nodes. Each decision node tests one of the features from the feature set 116 in accordance with a decision rule. Each decision node includes multiple branches that can be taken depending on how the value of the corresponding feature aligns with the decision rule for that decision node. The final branch in a path corresponds to a classification for the feature vector. Accordingly, when the feature set 116 is input into the decision tree, the feature set takes a path through the decision nodes dependent on the values of the various features and finally arrives at a classification.

The decision tree may be generated with a machine learning process. The machine learning process can be a supervised machine learning process. The supervised machine learning process is performed with training set data. The training set data includes a plurality of feature sets and a plurality of labels. Each feature set is labeled with a known classification. During the machine learning process, the feature sets are provided to the model. The model processes the feature sets through a pathway of operation based on initial rules. After the feature sets have been passed through the model, the classifications for the feature sets are compared to the known labels and the overall accuracy of the model is assessed. The machine learning process then adjusts the arrangement of weights/parameters. The feature sets are then passed through the model again and classified. The accuracy of the classification for the feature sets is again assessed and the algorithm 120 is adjusted. The process of classification, accuracy checking, and adjustment of the algorithm are performed repeatedly until the accuracy of the model no longer increases or until other conditions are met. The result of this process is that the model is trained to reproduce the labels for the training set.

While the discussion herein describes an example in which the classifier 112 is a decision tree, other types of classifiers can be utilized without departing from the scope of the present disclosure. For example, logistic regression classifiers, naïve Bayes classifiers, stochastic gradient descent classifiers, K nearest neighbors classifiers, random forest classifiers, support vector machine classifiers, or other types of classifiers can be used in accordance with principles of the present disclosure.

As will be described in more detail below, the sensor configuration system 106 generates updated classifiers for the sensor unit 104. The sensor configuration system 106 also generates other types of configuration data 110 for the sensor unit 104. The sensor configuration system 106 generates the updated classifiers 112 and the configuration data 110 based on sensor data to the sensor configuration system 106 by the electronic device 102.

Figure 3:
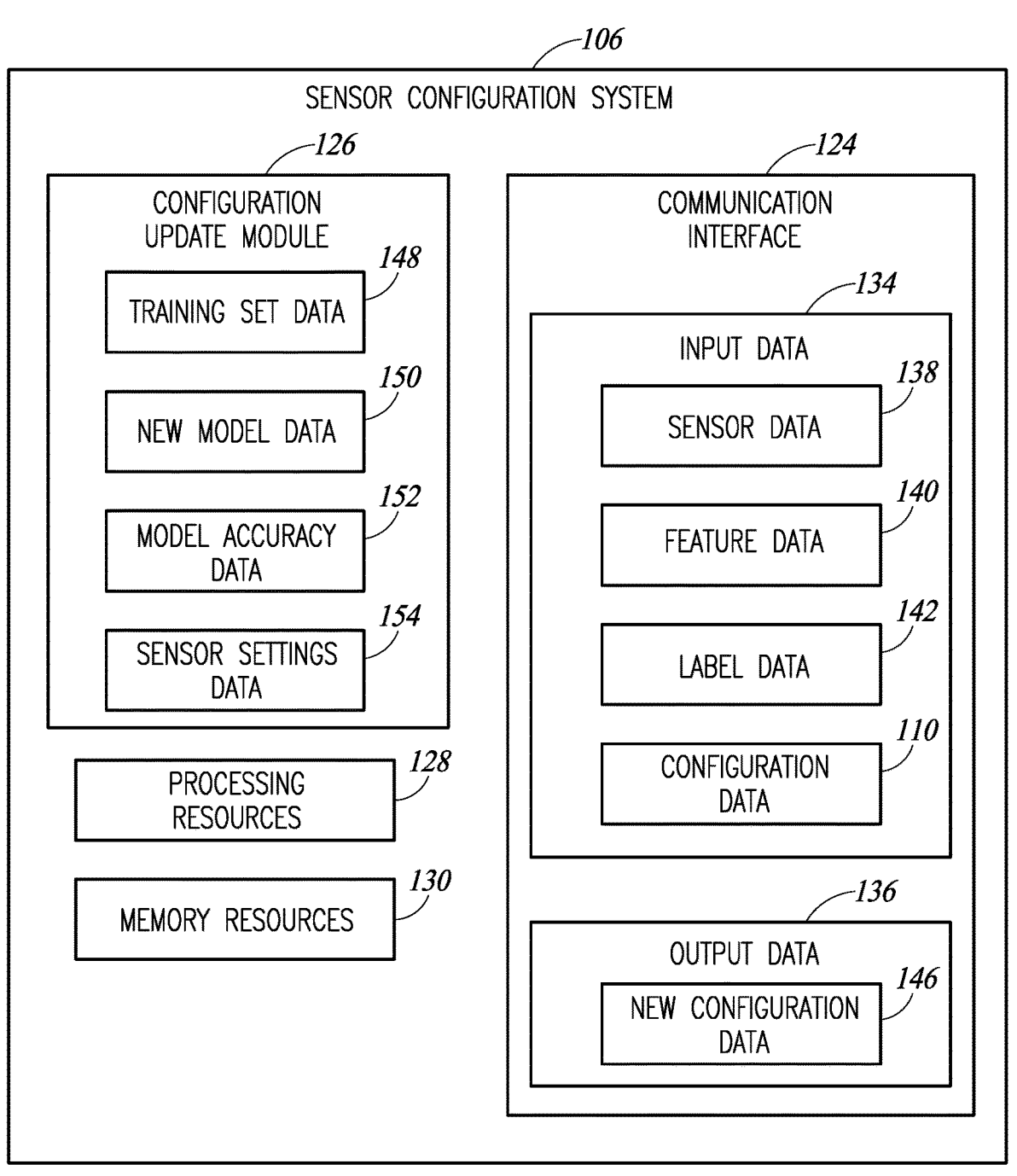
FIG. 3 is a block diagram of a cloud-based sensor configuration system, according to one embodiment.

FIG. 3 is a block diagram of a sensor configuration system 106, according to one embodiment. The sensor configuration system 106 is a cloud-based sensor configuration system. The sensor configuration system 106 utilizes cloud computing resources to generate updated configuration data for the sensor unit 104. The sensor configuration system 106 communicates with the electronic device 102 via one or more networks 108. The sensor configuration system 106 advantageously utilizes cloud-based computing resources to generate updated configuration data for the sensor unit 104.

The sensor configuration system 106 includes a communication interface 124, a configuration update module 126, processing resources 128, and memory resources 130. The components of the sensor configuration system 106 cooperate together to efficiently and effectively generate customized configuration data for the sensor unit 104.

The communication interface 124 receives input data 134 from the electronic device 102. The communication interface 124 provides output data 136 to the electronic device 102. The communication interface 124 communicates with the electronic device 102 via the networks 108.

The input data 134 can include sensor data 138. The electronic device 102 can obtain the sensor data 138 from the sensor unit 104. The sensor data can include digitized versions of sensor signals output by the sensors of the sensor unit 104. In the example in which the sensor unit 104 includes an accelerometer and a gyroscope, the raw sensor data 134 can include the raw acceleration data and the raw rotational motion data provided by the accelerometer and the gyroscope.

The input data 134 can include feature data 140. The feature data can include data generated for each of a plurality of features from the sensor signals. In one example, many features can be extracted or computed from the sensor signals. The feature data 140 can include data computed or extracted from the sensor signals for each of a plurality of features.

The feature data 140 can include a plurality of feature sets each generated from sensor data from a particular window of time. For example, as described in relation to FIG. 2, the classifier 112 of the sensor unit 104 receives a feature set and generates a classification for the feature set. The feature set can correspond to feature sets that have been provided to the classifier 112 of the sensor unit 104 in the past. Accordingly, the sensor configuration system 106 receives a plurality of feature sets that have been previously classified by the classifier 112 of the sensor unit 104.

In one embodiment the sensor configuration system 106 does not receive the feature data 140 from the electronic device 102. Instead the sensor configuration system 106 can generate the feature data 140 from the sensor data 138. Additionally, or alternatively, the sensor configuration system 106 can receive the feature data 140 from the electronic device 102 and can generate adjusted feature data from the sensor data 138 for training purposes, as will be described in more detail below.

The input data 134 can include label data 142. The label data 142 includes, for each feature set from the feature data 140, a label. The label is a correct classification for that feature set. The correct classification corresponds to a correct context of the electronic device 102 associated with the period of time associated with the feature set. As described previously, the label data 142 can be generated by the electronic device 102.

The input data 134 can include configuration data 110. The configuration data 110 corresponds to the current configuration data installed on the sensor unit 104. The configuration data 110 can include the current classifier 112 installed on the sensor unit 104. The configuration data 110 can also include other configuration settings for acquiring sensor signals, processing the sensor signals, and for generating feature data from the sensor signals. In an example in which the sensor unit 104 includes motion sensors such as accelerometers and gyroscopes, the configuration data 110 can include configuration settings such as sampling rates for sampling sensor signals from the motion sensors, filter settings for filtering the sampled sensor signals, window sizes for generating feature sets from the sensor data 138, feature generation settings for calculating or generating feature sets from the sensor data 138, and other types of configuration data for configuring the sensor unit 104. Other types of sensor units 104 can have configuration data other than that described above without departing from the scope of the present disclosure. In one embodiment, the sensor data 138 includes the feature data 140, the label data 142, and the configuration data 110.

The output data 136 can include new configuration data 146. The new configuration data 146 includes new configuration settings to be installed in the sensor unit 104. The new configuration data 146 can include a new classifier, new filter settings, new feature generation settings, and other types of configuration data for configuring the sensor unit 104. The sensor configuration system 106 pushes the new configuration data 146 to the electronic device 102. The electronic device 102 installs the new configuration data 146 in the sensor unit 104.

The configuration update module 126 generates the new configuration data 146. The configuration update module 126 receives the input data 134 from the communication interface 124. The configuration update module 126 then performs various operations to generate new configuration data 146 in accordance with the input data 134 received from the sensor unit 104. In this way, the sensor configuration system 106 generates new configuration data 146 that is customized for the sensor unit 104 based on how the electronic device 102 has been used in the past.

In one embodiment, the configuration update module 126 generates training set data 148 from the input data 134. The training set data 148 includes the feature data 140 and the label data 142. The training set data 148 is used in one or more machine learning processes to generate a new classifier that can be provided to the sensor unit 104 with the new configuration data 146.

The configuration update module 126 utilizes the training set data 148 to train a new classifier. The training set data 148 includes a plurality of feature sets each matched to a label. During the machine learning process, the feature sets are passed to the new classifier and the new classifier generates a classification for each feature set. The classifications for each feature set are compared to the labels to determine the current accuracy of the new classifier. The internal parameters of the new classifier are then adjusted, the feature sets are passed to the classifier, classifications are generated, and the classifications are compared to the labels. This process continues in iterations until the accuracy of the new classifier can no longer be improved or until other selected conditions are met.

The configuration update module 126 generates new classifier data 150. The new classifier data 150 includes the new classifier that has been trained with the machine learning process.

In one embodiment, a portion of the feature data 140 and the label data are reserved from the testing set data. This reserved portion is used as test data to test the accuracy of the classifier. The test data is not used during the training process. Instead the test data is used after the training process to further assess the accuracy of the classifier with feature sets and labels that were not used during training.

In one embodiment, sensor data from electronics device is stored in a staging buffer after converting to feature data. The sensor configuration unit can take the decision of generating new configuration based on the accuracy, Kappa statistics, and relative absolute data using current configuration data. The sensor configuration unit will also check the dataset imbalance and total feature data length. The checks on data imbalance includes test to check if new data improves the data balancing of the current model or if new data is already balanced. The new configuration will only be generated if the length of the new feature data is greater than 5% of the current configuration training data.

The configuration update module 126 generates accuracy data 152. The accuracy data 152 indicates the accuracy of the new classifier. The accuracy data 152 can include various types of accuracy data including percentage of correct classifications, error function data, Kappa statistics, relative absolute error data, root relative squared error data, and other types of data for measuring the accuracy of the new classifier.

The model accuracy data 152 can also include accuracy data for the currently installed classifier 112 of the sensor unit 104. The configuration update module 126 can compare the accuracy of the new classifier to the accuracy of the currently installed classifier. If the new classifier performs better than the currently installed classifier 112 as indicated by the accuracy data 152, then the sensor configuration system 106 may push the new classifier to the sensor unit 104.

In one embodiment, the input data 134 can include accuracy data associated with the currently installed classifier 112. In other words, accuracy data associated with the currently installed classifier 112 can be provided to the sensor configuration system 106 by the electronic device 104.

In one embodiment, the sensor configuration system 106 generates accuracy data 152 for the currently installed classifier 112. The configuration data 110 received by the communication interface 124 can include the current classifier 112. The configuration update module 126 can pass the feature data 140 to the current classifier 112 and compare the generated classifications to the labeled data 142. In this way, the configuration update module 126 can generate accuracy data 152 for the currently installed classifier 112.

In one embodiment, the configuration update module 126 generates a new classifier that receives a different set of features than those of the current classifier. Referring to FIG. 2, each feature set for the currently installed classifier 112 includes values for N features. The configuration update module 126 may generate a new classifier that does not receive the same N features. The new classifier may be configured to receive feature sets that include one or more features not included in the feature sets for the current classifier 112. Additionally, or alternatively, the new classifier may be configured to receive feature sets that do not include one or more of the N features included in the feature sets for the current classifier 112. Accordingly, the new classifier generated by the sensor configuration system 106 can receive different sets of features than the currently installed classifier 112.

In one embodiment, the configuration update module 126 generates and trains a plurality of new classifiers. The various classifiers can include many different sets of features. The configuration update module 126 generates accuracy data 152 for each of the new classifiers. The configuration update module 126 can select the new classifier that has the highest accuracy in accordance with one or more accuracy measurement parameters.

In one embodiment, the configuration update module 126 generates and trains a plurality of new classifiers for each of a variety of sets of features. If there are M types of features that can be used for feature sets, then the configuration update module 126 can generate and train a new classifier whose feature sets include up to M feature types. The configuration update module 126 can also generate and train a new classifier for each possible subset of M-1 feature types. The configuration update module 126 can generate and train a new classifier for each possible subset of M-2 feature types and so forth. The configuration update module 126 can generate and train new classifiers for a large number of different sets of feature types. The configuration update module 126 can generate accuracy data 152 for each new classifier. The configuration update module 126 can select the most accurate new classifier to be pushed and installed on the sensor unit 104.

If the feature data 140 does not include feature types that may be tested for new classifiers, the configuration update module 126 can generate these feature types from the sensor data 138. Alternatively, the sensor configuration system 106 can request that the electronic device 102 generates the requested new feature types from the sensor data 130. The training set data 148 can be adjusted to include the new feature types.

In one embodiment, the configuration update module 126 generates sensor settings data 154. The sensor settings data 154 can include various settings for receiving and processing the sensor signals output by the sensors of the sensor unit 104. Generating the new classifiers can include selecting various sensor settings included in the sensor settings data 154. For example, the configuration update module 126 can select various sensor settings based on which feature data should be generated from the sensor data.

In one embodiment, the sensor settings data 154 includes sampling rates. The configuration update module 126 may select sampling rates for collecting data from the sensors. The sampling rates can affect how the feature data is generated. If a sampling rate is too low, meaningful information may be lost when generating values for various of the features to be provided to the classifier. If a sampling rate is too high, generating feature values may be unduly resource intensive in terms of processing and memory resources. Accordingly, the configuration update module 126 can select or adjust sampling rates for the sensor unit 104.

In one embodiment, the sensor settings data 154 includes filter settings. The configuration update module 126 may select filter settings for filtering the sensor signals provided by the sensors of the sensor unit 104. Accordingly, the sensor signals are passed through one or more filters before the feature values are generated. The filters can include low-pass filters, high-pass filters, band pass filters, or other types of filters. The sensor configuration system 106 can select one or more types of filters as well as the cutoff frequencies for the filters. The configuration update module 126 can select the filter parameters based on analysis of the sensor data 138 and/or the feature data 140. In the example of motion sensors, the selection of the filter types and the frequencies of interest can be done by finding, in the sensor data, frequencies of significant energy and nonoverlapping regions between classes. These selections can be made by performing frequency domain analysis on the raw sensor data. The frequency domain analysis can include performing Fourier transforms, such as fast Fourier transforms or other types of transforms on the sensor data. The filter settings may also include transfer functions and Fourier transforms.

In one embodiment, the sensor settings data 154 includes window size settings. The configuration update module 126 may select window sizes for generating features. The window size corresponds to the length of time for which sensor data is compiled and feature values are generated. For example, a window size for generating a feature set may be less than a second, several seconds, or several minutes on the type of the sensor, the type of the electronic device 104, and the types of expected possible contexts for classification. The configuration update module 126 can select a window size for generating feature sets with the sensor unit 104.

The sensor configuration system 106 can generate, train, and test new classifiers with various different sensor settings applied to the sensor data 138. Accordingly, a new classifier can be selected not only based on feature types but based on selected sensor settings.

After the configuration update module 126 has identified selected sensor settings and a new classifier, the configuration update module 126 generates new configuration data 146. The new configuration data 146 includes the new classifier and the sensor settings data 154. The new configuration data 146 can also include other types of data associated with a configuration for the sensor unit 104.

After the new configuration data has been generated by the configuration update module 126, the communication interface 124 outputs the new configuration data 146 to the electronic device 102. The electronic device 102 can then apply the new configuration data to the sensor unit 104. In particular, the electronic device 102 replaces the previous configuration data with the new configuration data. The sensor unit 104 will then include configuration data 110 based on the new configuration data 146. The configuration data 110 includes a classifier 112 that is the new classifier selected by the configuration update module 126.

In one embodiment, the sensor configuration system 106 can select features for a new classifier by analyzing the feature data 140. Some of the features may be highly correlated with each other, and therefore redundant. The configuration update module 126 can determine whether some features can be dropped for the new classifier. The sensor configuration system 106 can utilize cross-correlation techniques, entropy/information gain techniques, Bhattacharya distance techniques or other analysis techniques to identify features that can be removed without sacrificing accuracy of classification. After features have been selected for the new classifier, the sensor configuration system 106 can generate one or more new classifiers using the machine learning techniques described above.

The processing resources 128 include one or more processors. The memory resources 130 include one or more memories configured as computer readable media capable of storing software instructions and other data. The processing resources 152 are capable of executing software instructions stored on the computer readable media. In one embodiment, the various components of the sensor configuration system 106 utilize the processing resources 128 and the memory resources 130 to assist in performing their various functions. The processing resources 128 and the memory resources 130 can correspond to a cloud computing resources. Accordingly, the processing resources 128 and the memory resources 130 can be part of a cloud computing environment. Accordingly, the processing resources 128 and the memory resources 130 can include disparately located physical and virtual resources.

Figure 4:
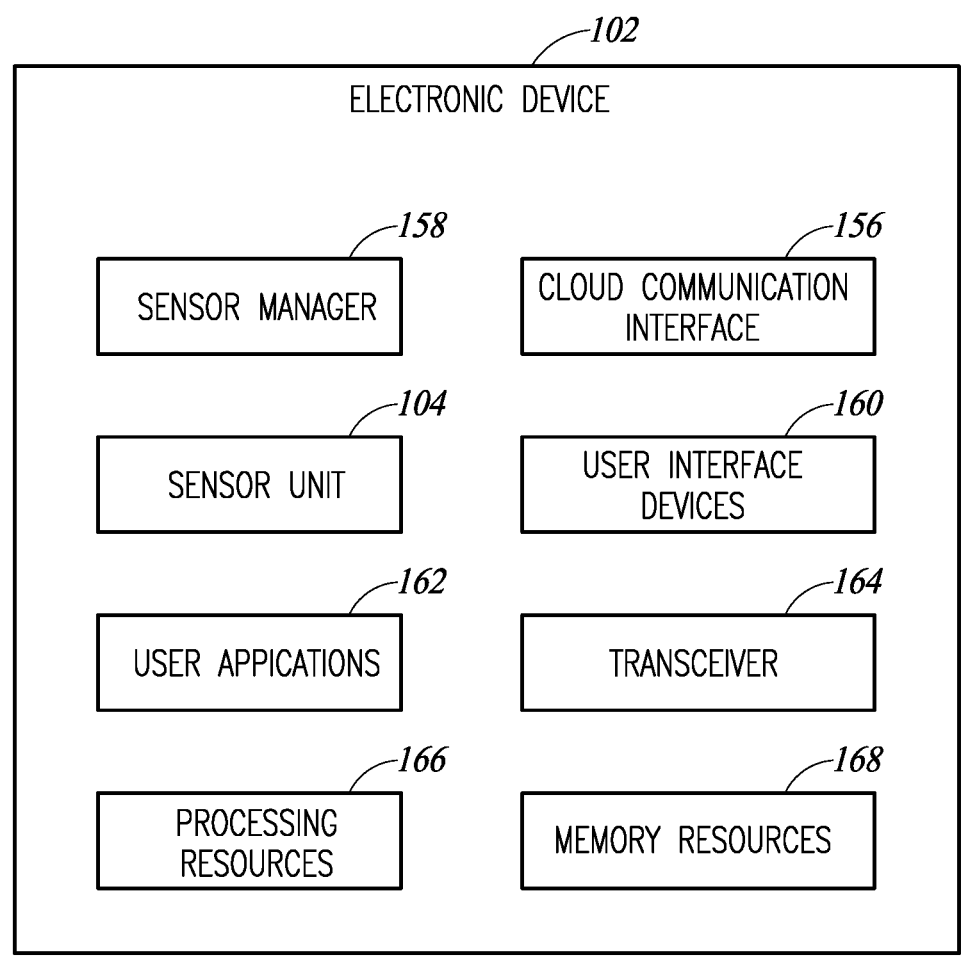
FIG. 4 is a block diagram of an electronic device, according to one embodiment.

FIG. 4 is a block diagram of an electronic device 102, according to one embodiment. The electronic device 102 communicates with the cloud-based sensor configuration system 106. The electronic device 102 includes a cloud communication interface 156, a sensor manager 158, user interface devices 160, the sensor unit 104, user applications 162, one or more transceivers 164, processing resources 166, and memory resources 168.

The cloud communication interface 156 manages communication between the electronic device 102 and the sensor configuration system 106. The cloud communication interface 156 manages the transmission of sensor related data to the sensor configuration system 106. The cloud communication interface 156 manages reception of new configuration data 146 from the sensor configuration system 106.

The sensor manager 158 updates the sensor unit 104 with the new configuration data 146. In particular, when the electronic device 102 receives new configuration data from the sensor configuration system 106, the sensor manager 158 writes the new configuration data 146 to the sensor unit 104. Accordingly, the sensor manager 158 updates the configuration data 110 of the sensor unit 104.

The sensor manager 158 receives data from the sensor unit 104. The sensor manager 158 can receive one or more of analog sensor data, digital sensor data, feature data, classification data, interrupt data, or other types of data from the sensor unit 104. The sensor manager can process the data received from the sensor unit 104 in preparation for providing sensor related data to the sensor configuration system 106.

In one embodiment, the sensor manager 158 labels the feature data received from the sensor unit 104. The sensor manager 158 can receive labels based on input received from the user, and/or the user applications 162, as will be described in more detail below.

The sensor manager 158 can also monitor the sensor unit 104. For example, the sensor manager 158 can monitor the classifier 112 to determine whether the classifier 112 is functioning in accordance with the most up-to-date configuration data. If there are multiple sensor units 104 associated with the electronic device 102, the sensor manager 115 can manage the configuration settings and the classifiers for each of the sensor units.

The sensor manager 158 can cause the sensor unit 104 to change a data output rate, sampling rate, or filter settings. For example, if the classifier 112 is an activity recognition classifier and a particular activity is detected, the sensor manager can trigger the sensor unit 104 to change a dynamic range of the accelerometer, to change a data output rate, or to change filter settings based on the type of detected activity. The sensor manager 158 may not change the data output rate settings if the classifier 112 has not been updated, in one embodiment.

The user interface devices 160 include any devices or functionality that enable a user to interact with the electronic device 102. In the example of a smart phone, the user interface devices can include a touchscreen, input buttons, power button, volume buttons, a home button, a microphone, a speaker, or any other devices or functionality that enable a user to provide input to the electronic device 102 or to receive output from the electronic device 102.

The user applications 162 include applications that can be utilized by a user of the electronic device 102 for various purposes. In one example, the user applications 162 include an exercise monitoring application. The exercise monitoring application enables the user to track parameters of various exercises performed by the user including walking, jogging, riding a bicycle, running on a treadmill, riding a stationary bicycle, weightlifting, running stairs, or other types of exercises. In some cases, the user applications 162 may receive classification data from the sensor unit 104. The classification data can include a classification of an activity performed by the user based on data output by the sensors of the sensor unit 104. As described previously, the classifier 112 can receive feature values based on sensor data and can generate a classification for a context of the user electronic device, such as an activity being performed by the user while holding or wearing the electronic device 102. The user applications 162 can include navigation systems that help users navigate between destinations with a selected mode of transportation. The navigation system can rely on the sensor unit 104 to detect a mode of transportation. The classifier 112 can classify the mode of transportation. The user applications 162 can include many other types of user applications without departing from the scope of the present disclosure.

The electronic device 102 includes a transceiver 164. The transceiver 164 can wirelessly transmit and receive data. In one embodiment, when the cloud communication interface communicates with the sensor configuration system 106, the cloud communication interface 156 causes the transceiver 164 to output data wirelessly. Additionally, the transceiver 150 receives wireless data from the sensor configuration system 106 via the networks 108.

The processing resources 166 include one or more processors. The memory resources 168 include one or more memories configured as computer readable media capable of storing software instructions and other data. The processing resources 166 are capable of executing software instructions stored on the computer readable media. In one embodiment, the various components of the electronic device 102 utilize the processing resources 166 and the memory resources 168 to assist in performing their various functions.

Figure 5:
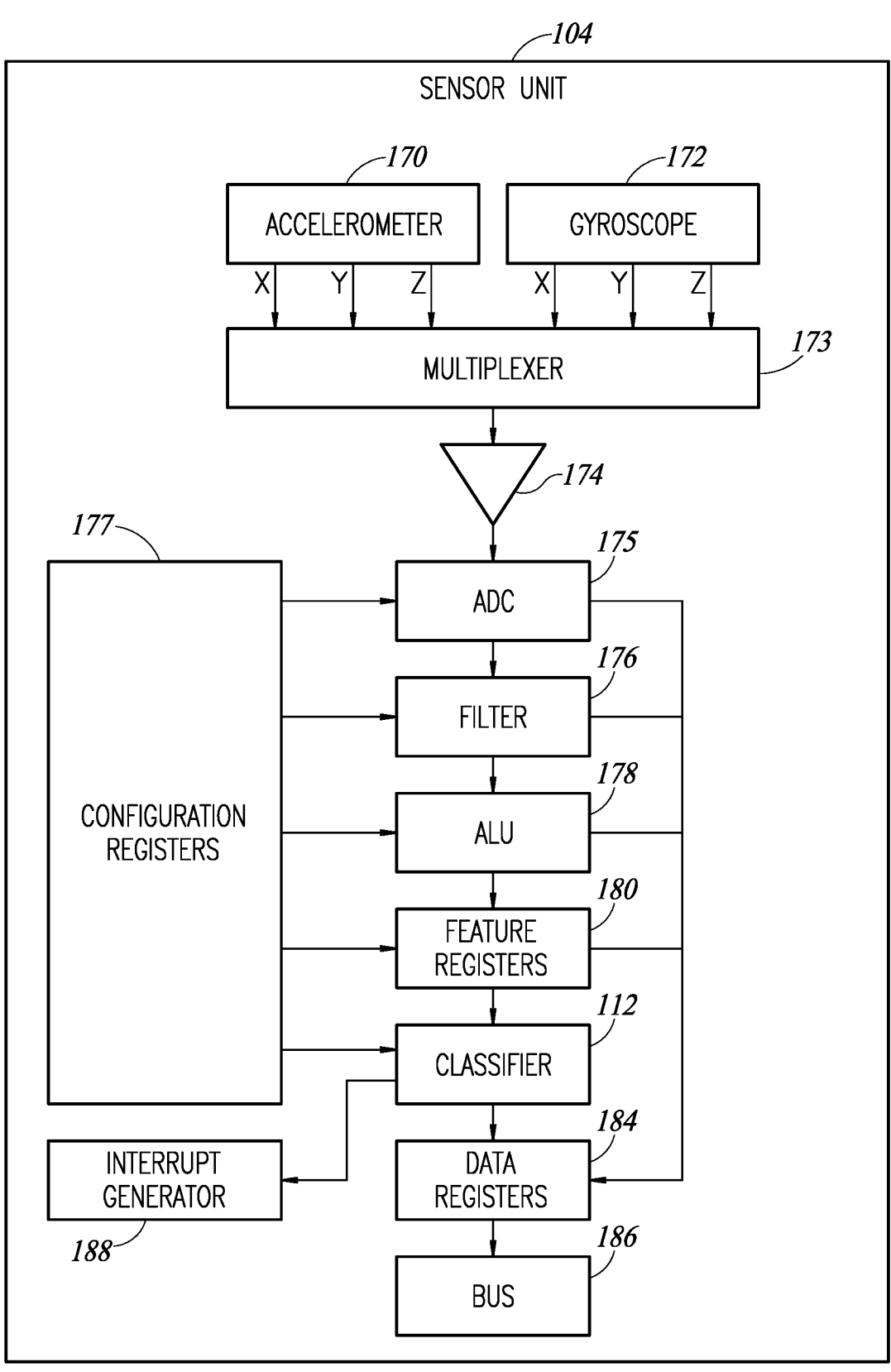
FIG. 5 is a schematic diagram of a sensor unit, according to one embodiment.

FIG. 5 is a schematic diagram of a sensor unit 104, according to one embodiment. In the example of FIG. 5, the sensor unit 104 is a motion sensor unit. Accordingly, the sensor unit 104 of FIG. 5 includes an accelerometer 170 and a gyroscope 172. Those of skill in the art will recognize, in light of the present disclosure, that a sensor unit 104 in accordance with principles of the present disclosure can include sensors other than motion sensors without departing from the scope of the present disclosure.

The accelerometer 170 generates linear acceleration signals for each of an X axis, a Y, and a Z axis. The linear acceleration signals can include analog linear acceleration signals. The linear acceleration signals are provided to the multiplexer 173.

The gyroscope 172 generates rotational motion signals for rotation about each of an X axis, a Y axis, and a Z axis. The rotational motion signals can include analog rotational motion signals. The rotational motion signals are provided to the multiplexer 173.

The multiplexer alternately provides the X, Y, and Z acceleration and rotational signals to an amplifier 174. The amplifier 174 amplifies the signals and provides them to an analog-to-digital converter 175.

The analog-to-digital converter 175 receives the amplified analog signals from the amplifier 174. The analog-to-digital converter 175 converts the analog signals to digital signals. The analog-to-digital converter 175 is configurable in accordance with the configuration data 110. In other words, the configuration data 110 can determine whether the analog-to-digital converter 175 acts as an 8-bit, 16-bit, 32-bit, etc. analog-to-digital converter. The analog-to-digital converter outputs the digital signals to the filter 176 and to the data registers 184.

The filters 176 receive the digital signals from the analog-to-digital converter 175. The filters 176 filter the digital signals with one or more of low pass filters, bandpass filters, and high pass filters. The filters are configurable in accordance with the configuration data 110. In other words, the configuration data 110 determines the types of filters and their cutoff frequencies. In alternative embodiments, the filter 176 is an analog filter that can filter analog signals prior to conversion to digital signals. The filters 176 output the filtered signals to the arithmetic logic unit 178 and to the data registers 184.

The arithmetic logic unit 178 generates feature values for the various types of features to be provided to the classifier 112. The arithmetic logic unit 178 takes the filtered digital signals and generates the various feature values by performing arithmetic functions on the digital signals. In one example, the features can include one or more of instantaneous acceleration for each of the axes, average acceleration for each of the axes, mean normal acceleration, instantaneous angular, a mean angle, a number of zero crossings, a peak to peak range of acceleration, a peak to peak range of angular motion for the various axes, a peak to peak range of mean normal acceleration, a peak to peak range of mean normal angular velocity, average long-term acceleration, average long-term angular motion, energy values, intensity of motion for each of the various axes, a total intensity, or other types of features that can be computed based on digital acceleration and angular motion data. The arithmetic logic unit 178 is configurable in accordance with the configuration data 110. The arithmetic logic unit can be adjusted to compute new features or to cease computing old features based on updated configuration data. The arithmetic logic unit outputs the feature values to the feature registers 180 and to the data registers 184.

The feature registers 180 store the feature values in feature sets or feature vectors. The feature sets can be provided to the classifier 112 so that the classifier 112 can classify a context of the electronic device for each feature set. The feature registers 180 are configurable in accordance with the configuration data 110. The feature registers 180 can be adjusted to store selected features in accordance with the current state of the classifier 112. If the classifier is updated to receive different numbers of features and/or different types of features, then the feature registers 180 are also updated to store the feature values in their proper sets. The feature registers 180 provide feature sets including feature values for each of a plurality of features to the classifier 112 and to the data registers 184.

The classifier 112 receives feature sets from the feature registers 180. For each feature set, the classifier 112 generates a classification. The classification classifies a current context of the electronic device 102 based on the feature sets and the current classifier algorithm of the classifier 112. The classifier 112 is configurable in accordance with the configuration data 110. When a new classifier is generated by the sensor configuration system 106, the classifier 112 is rewritten or reprogrammed in accordance with the new classifier. The classifier 112 outputs the classification data to the data registers 184 and to the interrupt generator 188.

The configuration registers 177 store the configuration data 110 for the sensor unit 104. The configuration data 110 includes the classifier 112, the settings for the feature registers 180, the settings for the arithmetic logic unit 178, the settings for the filter 176, and the settings for the analog-to-digital converter 175. The sensor manager 158 of the electronic device 102 updates the configuration registers with new configuration data provided by the cloud-based sensor configuration system. Accordingly, the sensor manager 158 is able to write data to the configuration registers 177 in order to change the configuration settings of the sensor unit 104.

The data registers 184 provide their various data to the bus 186. The data stored by the data registers 184 includes the digitized sensor signals, feature values generated by the arithmetic logic unit 178, feature sets stored by the feature registers 180, and classification data provided by the data registers 184. The bus 186 provides all of these data to the sensor manager 158. The sensor manager 158 can then further process the data, such as by generating labels. The sensor manager 158 can then output the sensor data to the sensor configuration system 106.

The interrupt generator 188 generates interrupts based on the classification data. The interrupt generator one provides the interrupts to the sensor manager 158. The sensor manager 158 can utilize the interrupt data to assist in generating labels for the feature sets.

A sensor unit 104 can include many other sensor types, components, and configurations of components in accordance with principles of the present disclosure without departing from the scope of the present disclosure.

FIG. 6 is a flow diagram of a method 600, according to one embodiment. At 602, the method 600 includes receiving, in a cloud-based sensor configuration system, sensor data related to a sensor unit of an electronic device. At 604, the method 600 includes generating training set data from the sensor data. At 606, the method 600 includes training a new classifier with a machine learning process using the training set data. At 608, the method 600 includes generating new configuration data including the new classifier. At 610, the method 600 includes outputting the new configuration data from the cloud-based sensor configuration system to the electronic device.

FIG. 7 is a flow diagram of a method 700, according to one embodiment. At 702, the method 700 receiving, in a cloud based sensor configuration system, sensor data of a sensor unit of an electronic device. At 704, the method 700 includes generating training set data from the stored sensor data. At 706, the method 700 includes training a plurality of new classifiers with one or more machine learning processes using the training set data. At 708, the method 700 includes comparing accuracies of the new classifiers with each other. At 710, the method 700 includes selecting one of the new classifiers based, at least in part, on the accuracies of the new classifiers. At 712 the method 700 includes outputting the selected new classifier to the electronic device.

FIG. 8 is a flow diagram of a method 800, according to one embodiment. At 802, the method 800 includes generating sensor signals with a sensor unit of an electronic device. At 804, the method 800 includes generating feature sets from the sensor signals by processing the sensor signals with the sensor unit in accordance with configuration data of the sensor unit. At 806, the method 800 includes classifying the feature sets by passing the feature sets through a classifier of the sensor unit. At 808, the method 800 includes outputting, from the electronic device to a cloud-based sensor configuration system, sensor data based on the sensor signals. At 810, the method 800 includes receiving, in the electronic device, a new classifier based on the sensor data. At 812 the method 800 includes replacing the classifier with the new classifier.

FIG. 9 is a flow diagram of a method 900, according to one embodiment. At 902, the method 900 includes generating sensor signals with a sensor unit of an electronic device. At 904, the method 900 includes generating feature sets with the sensor unit based on the sensor signals. At 906, the method 900 includes classifying the features sets with a classifier of the sensor unit. At 908, the method 900 includes sending, to a cloud-based sensor configuration system, sensor data from the electronic device based on the sensor signals. At 910, the method 900 includes generating, with the cloud-based sensor configuration system, a new classifier based on the sensor data. At 912 the method 900 includes outputting the new classifier to the electronic device from the cloud-based sensor configuration system. At 914 the method 900 includes replacing the classifier of the sensor unit with the new classifier.

Figure 10:
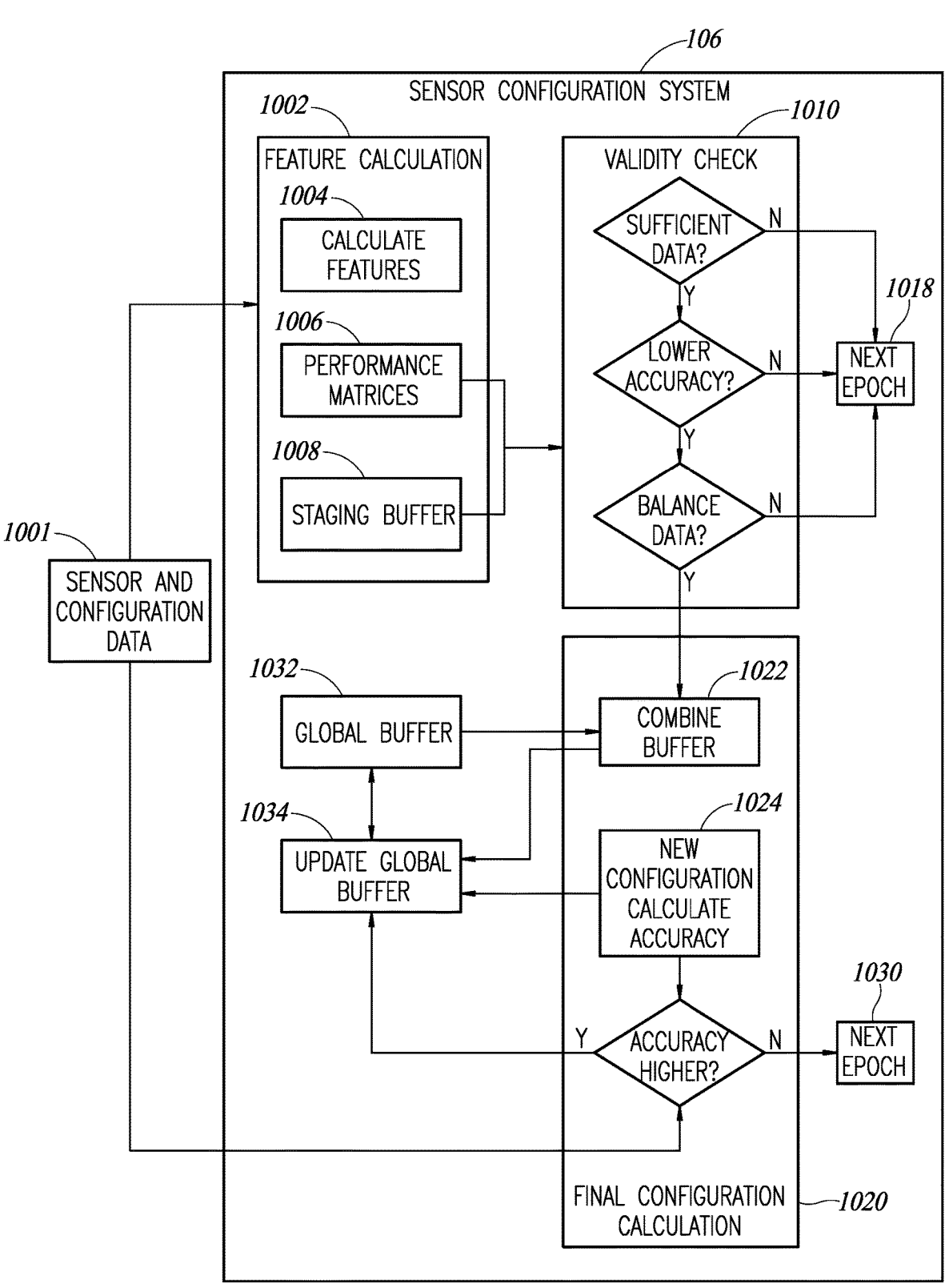
FIG. 10 is a block diagram of a cloud-based sensor configuration system, according to one embodiment.

FIG. 10 is a block diagram of a cloud-based sensor configuration system 106, according to one embodiment. The sensor configuration system includes a feature calculation stage 1002, a validity check stage 1010, and a final configuration calculation stage 1020. The sensor configuration system utilizes a staging buffer 1008 and global buffer 1032.

In one embodiment, when sensor and configuration data 1001 is received from the electronic device 104, or from another type of gateway, the sensor configuration system 106 initializes the feature calculation stage 1002. The feature calculation stage receives the sensor and configuration data 1001 and calculates features at 1004 from the sensor and configuration data. The feature calculation stage generates performance matrices from the configuration data at 1006. The feature calculation stage 1002 updates the staging buffer with the new feature data.

In one embodiment, the feature data and the performance matrices are provided to the validity check stage 1010. The validity check stage 1010 first determines whether there is a sufficient amount of data. If there is a sufficient amount of data, the validity check stage 101 determines whether the accuracy is lower. If the accuracy is lower, the validity check stage 1010 determines whether the data is balanced for all classes. If the data is balanced, the cloud based sensor configuration system 106 moves to the final configuration calculation stage 1020. If the data is not sufficient, if the accuracy is not higher, or if the data is not balanced, the sensor configuration system 106 proceeds to await the next epoch at 1018. As used herein, the term "epoch" refers to a period of time during which new sensor data is collected. The period of time can be selected or defined by the sensor configuration system 106, the electronic device 102, or the sensor unit 104 of the electronic device 102. The period of time can be variable depending on how long it takes the sensor unit 104 to generate a particular amount of new sensor data. The period of time could be in a range between several seconds and several days, though other periods of time can be utilized without departing from the scope of the present disclosure.

At the final configuration calculation stage 1020, at 1032 the combine buffer 1022 receives data from the validity check and the global buffer 1032. At 1024, new configuration data is generated, including new filter selections and new feature selections. The new configuration is trained and new performance parameters are calculated. The final configuration calculation stage 1020 compares the new configuration accuracy and performance parameters with the current configuration. If the accuracy is not higher, the sensor configuration system 106 awaits a new epoch at 1030. If the accuracy is higher, the result is that the new configuration will be pushed to the sensor unit. The global buffer 1032 is updated at 1034.

With reference again to FIG. 1, in order to reduce demands on the sensor configuration system 106, the electronic device 102 can determine when there is value in sending additional data to the sensor configuration system 106 in order to generate an updated classifier 112. Because the sensor configuration system 106 will utilize processing, memory, and data transmission resources each time a new classifier 112 is generated, it is beneficial if the electronic device 102 only sends sensor data to the sensor configuration system 106 if there is a likelihood that an improved classifier 112 can be generated based on the sensor data. Therefore, the electronic device 102 may make some basic checks on the new sensor data before providing new sensor data to the sensor configuration system 106.

In one embodiment, the electronic device 102 initially determines whether or not there is a sufficient amount of new sensor data to provide to the sensor configuration system 106. If the amount of sensor data is small, then the sensor configuration system 106 may not be able to make meaningful updates or improvements to the classifier 112. Accordingly, the electronic device 102 only sends new sensor data to the sensor configuration system 106 after ensuring that a sufficient amount of sensor data has been generated. The electronic device 102 can also determine whether there is sufficient new feature data to make meaningful updates to the classifier 112.

In one embodiment, the electronic device 102 initially determines whether or not new sensor data is sufficiently different from previous sensor data. If new sensor data is substantially similar to old sensor data, then it is possible that generating a new classifier based on sensor data that does not diverge from old sensor data will not result in meaningful differences between a new classifier 112 and the previous classifier. Expending system resources to generate new a new classifier 112 may in some circumstances be a poor use of system resources. However, if the new sensor data is sufficiently different than previous sensor data, then it may be valuable for the sensor configuration system 106 to generate a new classifier 112 (and other corresponding sensor configuration) based on the new sensor data. Accordingly, the electronic device 102 may ensure that new sensor data is meaningfully different from previous sensor data before sending the new sensor data to the sensor configuration system 106. Further details regarding determining whether the sensor data is sufficiently different from previous sensor data will be given further below in relation to FIG. 11.

After the electronic device 102 has determined that there is a sufficient amount of new and different sensor data to send to the sensor configuration system 106, the electronic device 102 prepares the sensor data to be sent to the sensor configuration system 106. This can include batching the sensor data. The batching can include organizing the sensor data into sets of sensor data. The sensor data can be organized by the period of time that the sensor data was generated, the particular features in the sensor data, by the labels associated with the sensor data, whether the sensor data is labeled or not, and in other ways. Batching can include placing new sensor data in a selected data format. In one example, the new sensor data is placed in a JSON format, though other formats can be utilized without departing from the scope of the present disclosure. After the new sensor data has been batched, the electronic device 102 sends the new sensor data to the sensor configuration system 106.

After receiving the new sensor data from the electronic device 102, the sensor configuration system 106 also determines whether or not there is a sufficient amount of new sensor data to generate a new classifier 112 or to otherwise generate new sensor configuration data for the sensor unit 104. As described previously, if the amount of new sensor data is small, then the sensor configuration system 106 may not be able to make meaningful updates or improvements to the classifier 112 or to other sensor configuration parameters. Accordingly, the sensor configuration system 106 only generates new sensor configuration data after ensuring that a sufficient amount of new sensor data has been received from the electronic device 102.

The sensor configuration system 106 also determines whether or not the new sensor data received from the electronic device 102 is sufficiently different from previous sensor data. The sensor configuration system 106 compares the new sensor data to previously received sensor data in order to determine if the new sensor data is sufficiently different.

After the sensor configuration system 106 has determined that there is a sufficient amount of new and different sensor data, the sensor configuration system 106 utilizes the new sensor data to generate new or updated sensor configuration data. The new or updated sensor configuration data can include a new classifier 112, the sensor settings, the filter settings, new features, or other data related to aspects of the sensor unit 104.

In one embodiment, the sensor configuration system 106 includes a machine learning based analysis model for generating new sensor configuration data. The analysis model can include a neural network or other types of networks for generating new sensor configuration data 106. Because the sensor configuration system 106 has greater processing, memory, and data transmission resources than the sensor unit 104, the analysis model of the sensor configuration system 106 can be far more powerful than the classifier of the sensor unit 104. The analysis model of the sensor configuration system can utilize deep learning, supervised learning, semi-supervised learning, or unsupervised learning in order to generate updated sensor configuration data.

In one example, the analysis model of the sensor configuration system 106 includes an ensemble model. In one example, the ensemble model includes a random forest model. A random forest model can include a large number of decision tree models for generating new sensor configuration data based on new sensor data from the electronic device 102. The analysis model of the sensor configuration system 106 can include other types of models without departing from the scope of the present disclosure. The analysis model of the sensor configuration system 106 can include ensemble models other than random forest models without departing from the scope of the present disclosure.

The analysis model of the sensor configuration system 106 generates new configuration data based on the new sensor data received from the electronic device 102 and on sensor data received previously from the electronic device 102. The analysis model of the sensor configuration system 106 can utilize all of the sensor data and associated labels in order to generate a classifier 112 and other configuration settings of the sensor unit 104 that results in highly accurate classification of activities or contexts associated with the sensor signals generated by the sensor unit 104.

The analysis model of the sensor configuration system 106 can utilize sensor data from sensor units of other electronic devices 102 in generating new configuration data for the sensor unit 104. In an example in which the electronic device 102 is a smartwatch worn by a particular individual, the sensor configuration system 106 can gather sensor data from a large number of smart watches worn by other individuals. This additional data from other smart watches can be utilized in generating new configuration data for the sensor unit 104 of the electronic device 102. The analysis model may be able to group the wearer of the smartwatch electronic device 102 with other individuals whose smart-watch sensor data is highly similar to the sensor data from the smartwatch electronic device 102. This grouping can assist in generating new configuration data by identifying highly effective configuration data associated with other smart watches of the group. Thus, the sensor configuration system 106 can use a large array of tools, techniques, and data sources in order to generate new configuration data for the sensor unit 104.

As discussed previously, the new sensor data received by the sensor configuration system 106 from the electronic device 102 may be labeled or unlabeled. Some of the new sensor data may be labeled based on labels provided directly by the user of the electronic device 102, such as when the user provides inputs to the electronic device 102 indicating that the user is walking, jogging, running, driving, lifting weights, or performing other activities. Some of the new sensor data may be labeled based on labels provided by the classifier 112 of the sensor unit 104. Some of the new sensor data may be labeled by the electronic device 102.

If the new sensor data provided to the sensor configuration system 106 is not labeled, the sensor configuration system 106 can generate labels in a semi-supervised process. The labels generated by the sensor configuration system 106 in a semi-supervised process can be utilized by the analysis model of the sensor configuration system 106 in generating new sensor configuration data.

The new configuration data generated by the sensor configuration system 106 can affect the various aspects of the sensor unit 104. For example, the sensor unit 104 may filter sensor signals generated by the sensors of the sensor unit 104. The new configuration data can include new filter settings for filtering the sensor signals generated by the sensors of the sensor unit 104. The filter settings can include high and low filter thresholds, transfer functions of filters and the corresponding signals to which the transfer function should be applied, and other settings associated with filtering the sensor signals. The new configuration data may adjust data output rate, the interrupt configuration, the full scale range of the sensor signals, window size settings, and other aspects of the sensor unit 104. The new configuration data can also adjust, remove, or add features to be generated from the sensor signals. With reference to FIG. 2, the classifier 112 of the sensor unit 104 receives the feature vector 116 including a plurality of features and generates classification data 118 based on the feature vector 116. The new configuration data can remove one or more features, add one or more features, or revise one or more of the features.

The sensor configuration system 106 can track data associated with all previous sets of configuration data passed to the sensor unit 104. Each previous set of configuration data can be numbered and stored by the sensor configuration system 106. The classification accuracy associated with each previous set of configuration data can also be stored by the sensor configuration system 106. When new configuration data is generated, the new configuration data can be compared to previous versions of configuration data and the accuracy of the new classifier associated with the new configuration data can be compared to the accuracy of previous classifiers. In some cases, the sensor configuration system 106 may retrieve a previous set of classification data and provided to the sensor unit 104 of the electronic device 102.

Figure 11:
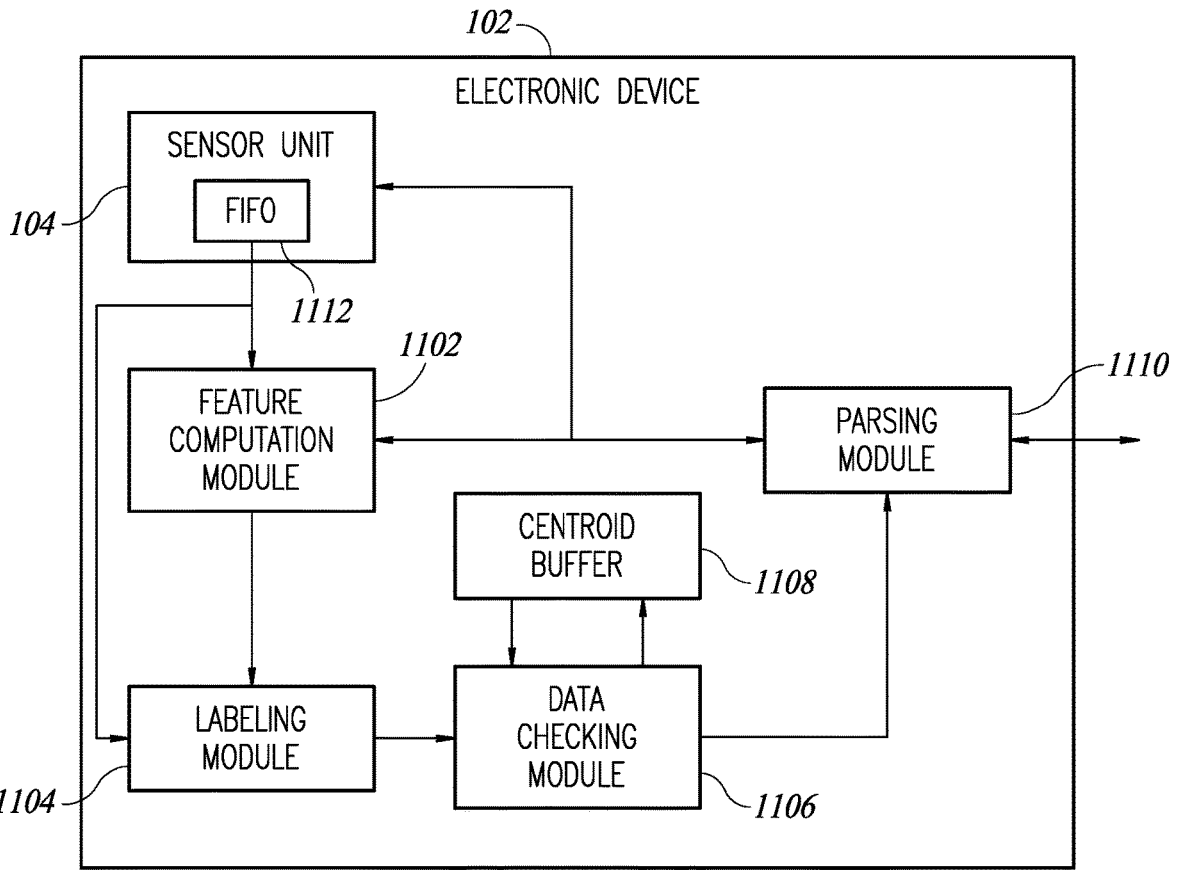
FIG. 11 is a block diagram of an electronic device, according to one embodiment.

FIG. 11 is a block diagram of an electronic device 102, in accordance with one embodiment. The electronic device 102 may include features, components, and systems described previously in relation to FIGS. 1-10. The electronic device 102 may include a smart phone, a smartwatch, smart glasses, or other types of personal electronic devices. The electronic device 102 may correspond to an industrial node of an automobile or another type of vehicle.

The electronic device 102 includes a sensor unit 104. The sensor unit 104 can include components, features, and systems described previously in relation to FIGS. 1-10. In one example, the sensor unit 104 is an inertial sensor unit including a multiaxis accelerometer and a multiaxis gyro-scope. In another example, the sensor unit 104 includes one or more environmental sensors such as image sensors, laser sensors, light sensors, humidity sensors, or other types of environmental sensors without departing from the scope of the present disclosure. The sensor unit 104 can include other types of sensors without departing from the scope of the present disclosure.

The sensor unit 104 generates sensor signals. The sensor signals indicate a sensed quantity associated with the electronic device. The sensor signals can include raw acceleration signals, raw gyroscope signals, raw image sensing signals, or other types of raw sensor signals depending on the type or types of the sensors included in the sensor unit 104. The sensor signals are initially analog signals. The sensor unit 104 may digitize the analog sensor signals. As described previously, the sensor unit 104 may include a classifier 112 that generates classifications associated with the sensor signals.

The sensor unit 104 includes a first in first out (FIFO) buffer 1112. The digitized sensor signals are passed to the FIFO buffer. The data passed to the FIFO may include the classification generated by the classifier 112. The classification generated by the classifier 112 corresponds to a labeled probe sensor signals. The data passed to the FIFO buffer 1112 may also include feature data.

When the sensor unit 104 generates sensor data, the sensor data is passed from the FIFO buffer 1112 to the feature computation module 1102 of the electronic device 102. More particularly, the electronic device 102 may first determine whether or not the sensor data coming from the FIFO 112 includes feature data. As described previously, the feature data is generated from the raw sensor signals by performing various computations or transformations related to the raw sensor signals. Some of these may be performed by the sensor unit 104. Accordingly, some of the sensor data from the FIFO buffer 1112 may include feature data. If the sensor data output by the FIFO buffer 1112 is not feature data, then the sensor data is passed to the feature computation module 1102 of the electronic device 102. If the sensor data output by the FIFO buffer 1112 is feature data, then the sensor data bypasses the feature computation module 1102 and is provided directly to the labeling module 1104. In some cases, some of the sensor data output by the FIFO 1112 is feature data and some is not feature data. The portion that does not include feature data may be passed to the feature computation module 1102. The portion that includes feature data may be passed to the labeling module 1104.

The feature computation module 1102 receives the raw sensor data from the FIFO 1112 and computes a series of features from the raw sensor data. In an example in which the raw sensor data includes digitized accelerometer and gyroscope signals, the feature computation module 1102 performs computations and transformations on the raw sensor data in order to generate feature data. Features can include mean values, variance values, energy values, peak to peak values, zero crossings values, or other features which can be obtained based on the raw sensor data. The feature computation module 1102 outputs the feature data to the labeling module 1104.

The data received by the labeling module 1104 includes feature data output by the FIFO buffer 1112 and feature data output by the feature computation module 1102. The labeling module 1104 labels the feature data. In some cases, the labeling module 1104 may merely attach to the feature data a label or classification generated by the classifier 112. In some cases, the labeling module 1104 may attach to the feature data a label provided by the user of the electronic device 102. Accordingly, the labeling module 1104 attaches, to each set of feature data, a label. Alternatively, the labeling module 1104 may merely ensure that a label is attached to each set of feature data. The labeling module 1104 passes the labeled sensor data to the data checking module 1106.

The data checking module 1106 determines whether or not the sensor data sufficiently diverges from previous sensor data to merit sending the sensor data to the sensor configuration system 106. As described previously, the data checking module 1106 may compare the sensor data to previous sensor data or to represent the values computed from previous sensor data. If the data checking module 1106 determines that the sensor data sufficiently diverges from previous sensor data, then the sensor data may be passed on to the parsing module 1110. If the data checking module 1106 determines that the sensor data does not sufficiently diverge from previous sensor data, then the data checking module 1106 may not pass on the sensor data to the parsing module 1110.

In one embodiment, the electronic device 102 includes a centroid buffer 1108. The centroid buffer stores centroid data associated with previous batches of sensor data. The centroid data may indicate mean, median, average, characteristic ranges, or other types of values that indicate the center in range of previous batches of sensor data. This data can be utilized to determine whether or not new sensor data diverges from previous sensor data. The centroid buffer 1108 may store separate centroid values or ranges of values for each feature. For example, if the labeled sensor data from the labeling module 1104 includes 12 types of features, then the centroid buffer may store individual centroid data for each of the 12 features.

When checking for divergence, the data checking module 1106 may compare the sensor data associated with each feature the corresponding feature centroid value stored in the centroid buffer 1108. The data checking module level 1106 may generate a divergence score for each feature in the sensor data. The data checking module 1106 may determine that there is sufficient divergence if one or more features in the sensor data sufficiently diverge from the associated centroid value. The data checking module 1106 may determine that there is sufficient divergence if a selected number of features diverge from their associated center and valleys.

The data checking module 1106 may also determine whether there is a sufficient amount of new sensor data to merit sending the sensor data to the sensor configuration system 106. The data checking module 1106 may wait until a sufficient amount of sensor data has been received before sending the sensor data to the parsing module 1110. The data checking system 106 may check for both sensor data divergence and sensor data volume before sending sensor data onto the parsing module 1110.

The parsing module 1110 may correspond to an I/O module. The parsing module 1110 may receive the sensor data from the data checking module 1106 and may place the sensor data into a format that can be easily received and read by the sensor configuration system 106. The parsing module 1110 may place the sensor data into a selected format such as JSON format or another suitable format.

The parsing module 1110 may separate the sensor data into three categories. A first category may include sensor configuration data associated with the sensor unit 104. This can include sensor settings such as sampling rates, filter types, sensor type, number of features, data type, meta-classifier data, data associated with the classifier 112, or other types of data associated with the sensor unit 104. The first category can include the types of configuration data that may be adjusted when the sensor configuration system 106 updates the sensor unit 104.

A second category utilized by the parsing module 110 may be feature data. As set forth previously, some or all of the sensor data may be computed into feature data by the feature computation module 1102 or even by the sensor unit 104. The parser module 1110 can format the sensor data such that feature data is placed in a particular category.

A third category utilized by the parsing module 1110 may include raw sensor data. It may be beneficial to send the raw sensor data from the sensor unit 104 to the sensor configuration system 106. Accordingly, the parsing module 1110 may separately categorize the raw sensor data so that the raw sensor data can be easily identified by the sensor configuration system 106.

There may be advantages associated with storing data in JSON or XML formats because they are human readable. However, this may also result in very large file sizes. Accordingly, in one embodiment, some of the sensor data may be placed in a JSON or XML format while other aspects of the sensor data may be placed in binary. For example, a JSON or XML format may be utilized to store a sensor name, a device ID, a Mac address, Wi-Fi settings, label names, description of data, and any other relevant information. Binary or text file format can be used primarily force raw sensor data or feature values. The electronic device 102 may also encrypt the sensor data before sending the sensor data to the cloud to ensure user privacy.

After the parsing module 1110 has parsed the sensor data, the parsing module 1110 passes the sensor data to the sensor configuration system 106. The sensor configuration system 106 can then process the sensor data and can generate updated sensor configuration data for updating the sensor unit 104. The sensor configuration system 106 provides the sensor configuration data to the parsing module 1110. The parsing module 1110 may pass the sensor configuration data to the sensor unit 104, to the feature computation module 1102, or to other modules or components of the electronic device 102. Sensor unit 104 can be updated with the new sensor configuration data received from the sensor configuration system 106.

The electronic device 102 may include logic, systems, or modules for controlling and monitoring functions of the sensor unit 104. For example, the electronic device 102 can monitor the classifier 112 to ensure that the classifier operates in accordance with the conditions set by the sensor configuration data received from the sensor configuration system 106. In an example in which there are multiple sensor units 104 in the electronic device 102, the electronic device 102 can manage the configuration settings for each of the sensor units 104. The electronic device 102 can change output data rate settings and filter settings associated with the sensor unit 104. For example, if the classifier 112 is configured to the fact that physical activity of the user of the electronic device 102, and the classifier indicates the user is running, then the electronic device can trigger the sensor unit the change the dynamic acceleration range to 8 g (where g is the acceleration of gravity), the output data rate to 100 Hz, and to change aspects of a low-pass filter or high-pass filter.

Figure 12:
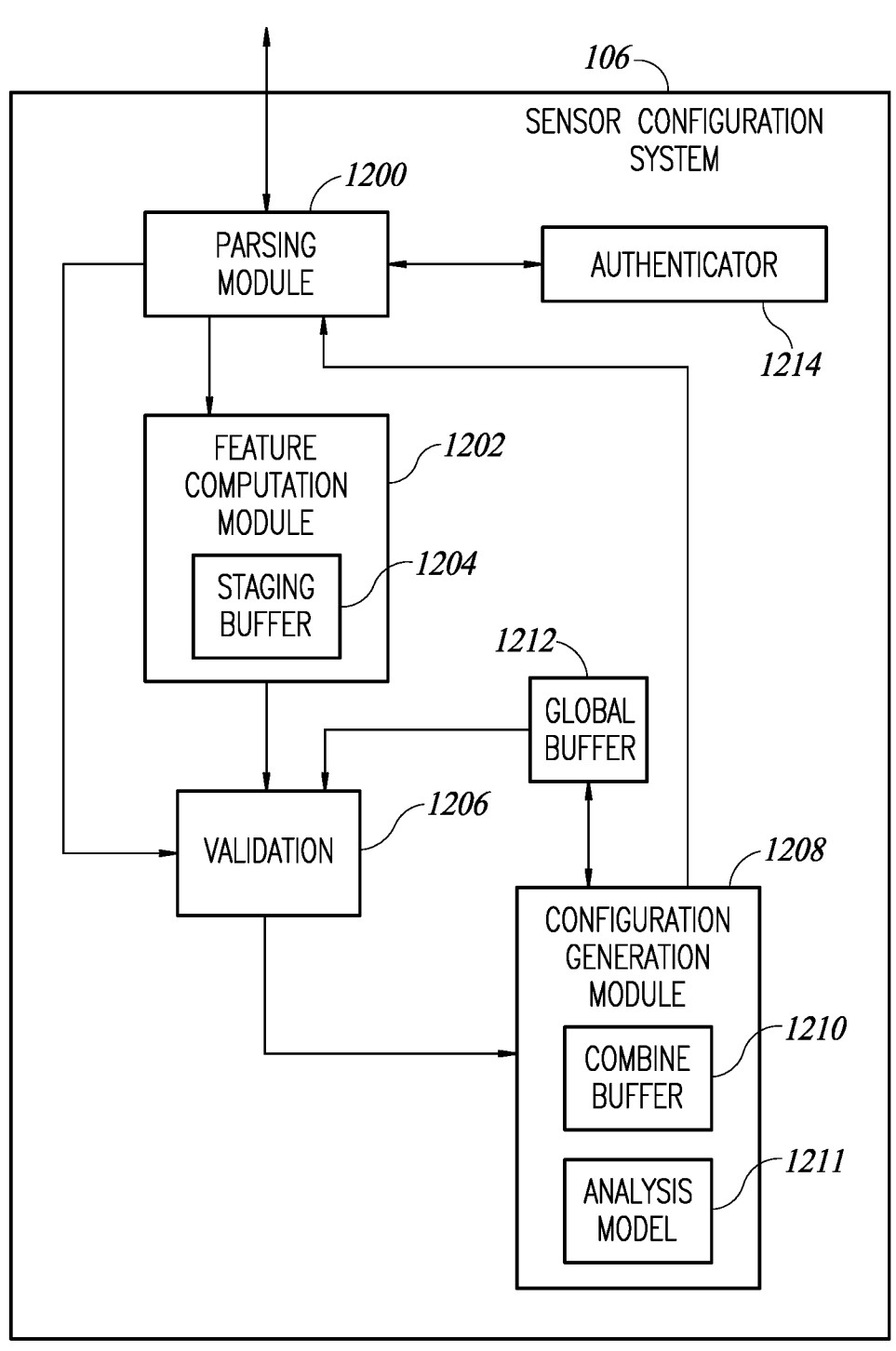
FIG. 12 is a block diagram of a cloud-based sensor configuration system, according to one embodiment.

FIG. 12 is a block diagram of a sensor configuration system 106, in accordance with one embodiment. The sensor configuration system 106 can include systems, components, processes described previously in relation to FIGS. 1-11. In particular, the sensor configuration system 106 receives sensor data from an electronic device 102 and generates updated sensor configuration data for a sensor unit of the electronic device 102. The sensor configuration system 106 may be implemented wholly or partially in a cloud computing environment.

The sensor configuration system 106 includes a parsing module 1200. The parsing module 1200 may function as an I/O module of the sensor configuration system 106. The parsing module 1200 may receive sensor data from an electronic device 102 as described in relation to FIG. 11 or in relation to other preceding Figures. The parsing module 1200 may separate the sensor data based on categories indicated in the sensor data. For example, the parsing module 1200 may separate the sensor data into raw sensor data, configuration data in feature data as described previously in relation to FIG. 11 or in other preceding Figures. The parsing module 1200 may be configured to parse data in the same types of formats utilized by the parsing module 1110 of FIG. 11.

The parsing module 1200 may pass configuration data in raw sensor data to the feature computation module 1202. The feature computation module 2012 may generate feature data from the raw sensor data based on the configuration data. For example, the configuration data indicates the types of features utilized by the classifier 112 of the sensor unit 104. The feature computation module may receive the raw sensor data and generate feature data in accordance with the types of features indicated by the configuration data.

The feature computation module 1202 may include a staging buffer 1204. The staging buffer 1204 stores the feature data generated by the feature computation module 1202. The staging buffer 1204 may also store raw sensor data and the configuration data received from the parsing module 1200. Staging buffer 1204 may be a temporary buffer for storing the newly received sensor data until the decision is made to utilize the newly received sensor data or to discard the newly received sensor data.

The validation module 1206 may receive feature data from the parsing module 1200. As described previously, the new sensor data may or may not include feature data. If the new sensor data does include feature data, then the feature data is passed from the parsing module 1202 validation module 1206. The label validation a generation module 1206 also receives feature data from the feature computation module 1202.

The validation module 1206 performs various validation checks on the sensor data. First, the validation module 1206 may determine whether the newly received sensor data is sufficiently large to warrant generating new configuration data based on the newly received sensor data. In one example, the validation module 1206 determines whether the newly received sensor data is larger than the threshold percentage of the total sensor data previously received and utilized by the sensor configuration system 106. If the newly received sensor data is greater than the threshold percentage of the total previously receives sensor data, then the validation module 1206 may determine that the newly received sensor data is sufficiently large to merit generating new sensor configuration data.

A second validation check may include an accuracy validation check. For example, the validation module 1206 may compare accuracy matrices associated with the newly received sensor data against accuracy matrices associated with the current configuration. If the data is sufficiently accurate, then the validation module 1206 may determine that the newly received sensor data should be utilized to generate new configuration data.

A third configuration check may include a data amounts check. For example, the validation module 1206 may check to ensure that the data in the staging buffer is balanced for all features. If the data in the staging buffer 1204 is balanced, then the validation module 206 may determine that the newly received sensor data should be utilized to generate new sensor configuration data.

After the validation module 1206 has determined that the newly received sensor data should be utilized to generate a new sensor configuration, the sensor data is passed to the configuration generation module 1208. The configuration generation module 1208 utilizes machine learning processes to generate new sensor configuration data based on the newly received sensor data and previously received sensor data.

The configuration and generation module 1208 interfaces with a global buffer 1212. The global buffer 1212 stores all of the sensor data previously utilized to generate sensor configuration data. The global buffer 1212 also stores data related to all previous configurations of the sensor unit 104 of the electronic device 102. Accordingly, the global buffer 1212 stores all data related to previous versions of the classifier 112, all previous settings associated with the sensor unit 104, and the accuracy of previous sensor configurations.

When the configuration generation module 1208 receives new sensor data from the validation module 1206, the new sensor data is stored in the combine buffer 1210 of the configuration generation module 1208. The combine buffer 1210 also receives the data from the global buffer 1212. Accordingly, the combine buffer now stores all the data that will be utilized to generate new configuration data for the sensor unit 104.

The configuration generation module 1208 includes an analysis model 1211. The analysis model 1211 is a machine learning based analysis model for generating new sensor configuration data. The analysis model 1211 can include a neural network or other types of networks for generating new sensor configuration data. Because the sensor configuration system 106 has greater processing, memory, and data transmission resources than the sensor unit 104, the analysis model 1211 of the sensor configuration system 106 can be far more powerful than the classifier 112 of the sensor unit 104. The analysis model 1211 of the sensor configuration system can utilize deep learning, supervised learning, semi-supervised learning, or unsupervised learning in order to generate updated sensor configuration data.

In one example, the analysis model 1211 of the sensor configuration system 106 includes a random forest model. A random forest model can include a large number of decision tree models for generating new sensor configuration data based on new sensor data from the electronic device 102. The analysis model 1211 of the sensor configuration system 106 can include other types of models that a random forest model without departing from the scope of the present disclosure.

The analysis model of the sensor configuration system 106 generates new configuration data based on the newly received sensor data and all of the previously utilized sensor data. The analysis model 1211 executes a powerful process to generate new sensor configuration data. The new sensor configuration data can include any classifier 112 and new sensor settings, as described previously.

During the process of generating new sensor configuration data, the analysis model 1211 generates a large number of sets of sensor settings and classifier models. The analysis model 1211 compares the accuracy of each of the new classifier models and corresponding sensor settings to the accuracy of previously utilized sensor configurations and to each other. When sensor configurations data is generated that surpasses the accuracy of the other sensor configuration data, the configuration generation module 1208 passes the new sensor configuration data to the parsing module 1200. After new sensor configuration data has been generated, the global buffer 1212 stores the new sensor configuration data and the newly received sensor data.

The parsing module 1200 prepares the new sensor configuration data to be sent to the electronic device 102. The parsing module 1200 places the sensor configuration data into a format that can be easily received and processed by the parsing module 1110 of the electronic device 102.

In one embodiment, the sensor configuration system 106 may also include an authenticator 1214. The authenticator 1214 may authenticate newly received sensor data from the electronic device 102. If the newly received sensor data is authentic, then the parsing module 1200 may proceed to provide the newly received sensor data to other modules of the sensor configuration system 106. If the newly received sensor data is not authentic, then the newly received sensor data will not be utilized by the sensor configuration system 106. The authenticator 1214 may also authenticate new sensor configuration data generated by the configuration generation module 1208 in the same manner.

Figure 13:
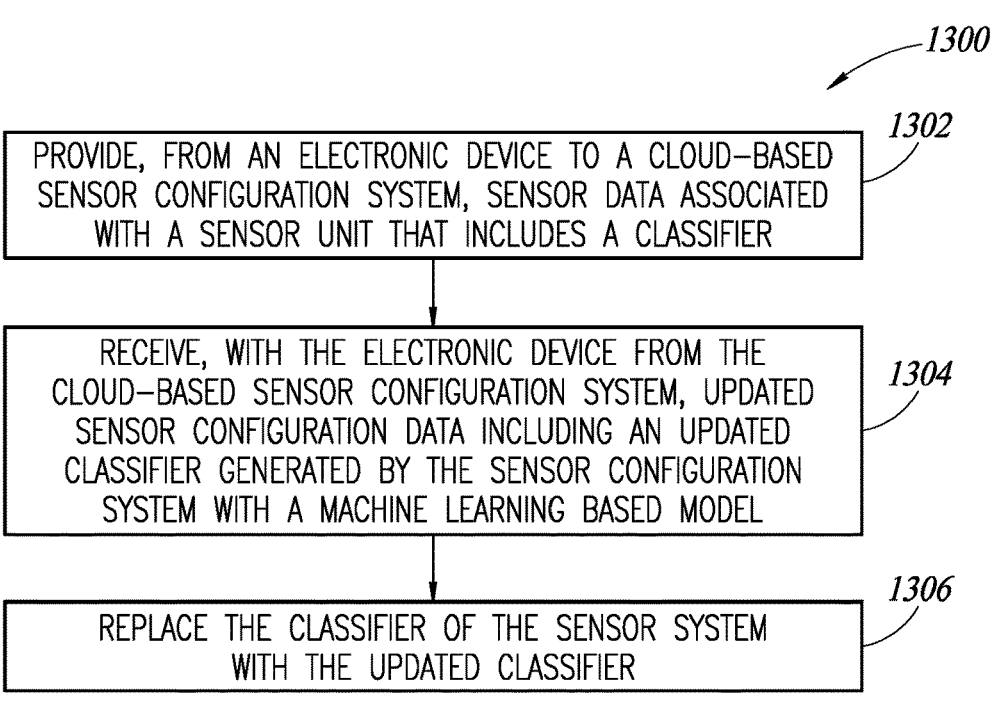
FIG. 13 is a flow diagram of a method for managing a sensor unit, according to one embodiment.

FIG. 13 is a flow diagram of a method 1300, in accordance with one embodiment. At 1302, the method 1300 includes providing, from an electronic device to a cloud-based sensor configuration system, sensor data associated with a sensor unit that includes a classifier. At 1304, the method 1300 includes receiving, with the electronic device from the cloud-based sensor configuration system, updated sensor configuration data including an updated classifier generated by the sensor configuration system with a machine learning based model. At 1306, the method 1300 includes replacing the classifier of the sensor system with the updated classifier.

Figure 14:
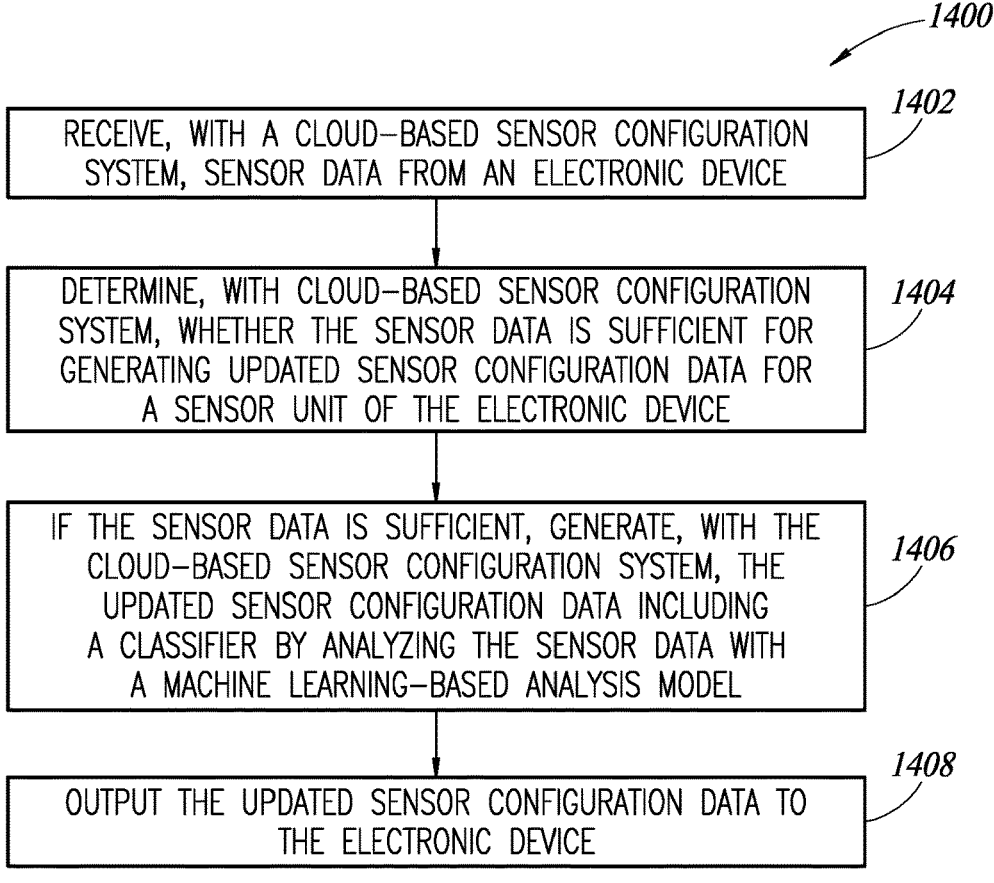
FIG. 14 is a flow diagram of a method for managing a sensor unit, according to one embodiment.

FIG. 14 is a flow diagram of a method 1400, in accordance with one embodiment. At 1402, the method 1400 includes receiving, with a cloud-based sensor configuration system, sensor data from an electronic device. At 1404, the method 1400 includes determining, with the cloud-based sensor configuration system, whether the sensor data is sufficient for generating updated sensor configuration data for a sensor unit of the electronic device. At 1406, the method 1400 includes, if the sensor data is sufficient, generating, with the cloud-based sensor configuration system, the updated sensor configuration data including a classifier by analyzing the sensor data with a machine learning-based analysis model. At 1408, the method 1400 includes outputting the updated sensor configuration data to the electronic device.

In one embodiment, a method includes providing, from an electronic device to a cloud-based sensor configuration system, sensor data associated with a sensor unit that includes a classifier and receiving, with the electronic device from the cloud-based sensor configuration system, updated sensor configuration data including an updated classifier generated by the sensor configuration system with a machine learning based model. The method includes replacing the classifier of the sensor system with the updated classifier.

In one embodiment, an electronic device includes a sensor unit configured to generate raw sensor data and including a machine learning-based classifier configured to identify a context of the electronic device. The device includes a feature computation module configured to generate feature data from the raw sensor data and an I/O module configured to output, to a cloud-based sensor configuration system, sensor data including the raw sensor data and the feature data, and to receive, from the cloud-based sensor configuration system, sensor configuration data including an updated classifier for the sensor unit.

In one embodiment, a method includes receiving, with a cloud-based sensor configuration system, sensor data from an electronic device and determining, with the cloud-based sensor configuration system, whether the sensor data is sufficient for generating updated sensor configuration data for a sensor unit of the electronic device. The method includes if the sensor data is sufficient, generating, with the cloud-based sensor configuration system, the updated sensor configuration data including a classifier by analyzing the sensor data with a machine learning-based analysis model and outputting the updated sensor configuration data to the electronic device.

In one embodiment, a method includes receiving, in a cloud-based sensor configuration system, sensor data related to a sensor unit of an electronic device, generating training set data from the sensor data, and training a new classifier with a machine learning process using the training set data. The method includes generating new configuration data including the new classifier and outputting the new configuration data from the cloud-based sensor configuration system to the electronic device.

In one embodiment, a method includes receiving, in a cloud based sensor configuration system, sensor data of a sensor unit of an electronic device, generating training set data from the sensor data, and training a plurality of new classifiers with one or more machine learning processes using the training set data. The method includes comparing accuracies of the new classifiers with each other, selecting one of the new classifiers based, at least in part, on the accuracies of the new classifiers, and outputting the selected new classifier to the electronic device.

In one embodiment, a method includes generating sensor signals with a sensor unit of an electronic device, generating feature sets from the sensor signals by processing the sensor signals with the sensor unit in accordance with configuration data of the sensor unit, classifying the feature sets by passing the feature sets through a classifier of the sensor unit, and outputting, from the electronic device to a cloud-based sensor configuration system, sensor data based on the sensor signals. The method includes receiving, in the electronic device, a new classifier based on the sensor data and replacing the classifier with the new classifier.

One embodiment is an electronic device including a sensor unit. The sensor unit includes a classifier. The sensor unit is configured to generate sensor signals, to generate feature sets by processing the sensor signals, and to classify the feature sets by passing the feature sets through the classifier. The electronic device includes a cloud communication interface configured to output, to a cloud-based sensor configuration system, sensor data based on the sensor signals and to receive, from the cloud-based sensor configuration system, new configuration data including a new classifier based on the sensor data. The electronic device includes a sensor manager configured to replace the classifier of the sensor unit with the new classifier.

In one embodiment, a method includes generating sensor signals with a sensor unit of an electronic device, generating feature sets with the sensor unit based on the sensor signals, and classifying the features sets with a classifier of the sensor unit. The method includes sending, to a cloud-based sensor configuration system, sensor data from the electronic device based on the sensor signals, generating, with the cloud-based sensor configuration system, a new classifier based on the sensor data, outputting the new classifier to the electronic device from the cloud-based sensor configuration system, and replacing the classifier of the sensor unit with the new classifier.

Further details regarding reconfigurable sensors are found in U.S. Pat. Nos. 10,142,789 and 10,260,877. U.S. Pat. Nos. 10,142,789 and 10,260,877 are incorporated herein by reference in their entireties.

The various embodiments described above can be combined to provide further embodiments. Aspects of the embodiments can be modified, if necessary, to employ concepts of the patents noted above to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
receiving sensor signals from an inertial sensor of a sensor unit of an electronic device;
amplifying the sensor signals with an amplifier of the electronic device;
generating digital sensor data by converting the amplified sensor signals to digital sensor data with an analog to digital converter of the electronic device;
receiving feature data from an arithmetic logic unit of the electronic device based on the digital sensor data;
generating, with an interrupt generator of the electronic device, an interrupt based on the feature data;
storing, in a memory of the electronic device, the sensor data with a current batch of sensor data;
receiving a centroid value based on the feature data;
storing, in a centroid buffer of the electronic device, a previous centroid value associated with a previous batch of sensor data generated by the inertial sensor;
receiving a divergence score relative to the centroid value and the previous centroid value associated with previous feature data of the previous batch of sensor data;

transmitting, with a transceiver of the electronic device, the batch of sensor data from the electronic device responsive to the divergence score;
receiving, in a configuration register coupled to the arithmetic unit, feature configuration data after transmitting the batch of sensor data;
receiving, from the inertial sensor after receiving the feature configuration data, new sensor signals;
generating, with the analog to digital converter, new sensor data based on the new sensor signals; and
receiving, from the arithmetic logic unit, new feature data based on the new sensor data and including a second set of features different than the first set based on the feature configuration data.

2. The method of claim 1, comprising labeling the sensor data using a classifier of the sensor unit.

3. The method of claim 2, wherein the classifier includes a decision tree.

4. An electronic device, comprising:
a sensor unit, comprising:
an inertial sensor configured to generate sensor signals;
an amplifier coupled to the inertial sensor and configured to amplify the sensor signals;
an analog to digital converter configured to generating digital sensor data by converting the amplified sensor signals to digital sensor data;
an arithmetic logic unit configured to receive the digital sensor data and to generate, based on the sensor data, feature data including a first set of features;
an interrupt generator configured to generate an interrupt based on the feature data received from the arithmetic logic unit;
a memory configured to store the sensor data with a current back of sensor data;
a centroid buffer configured to store a previous centroid value associated with a previous batch of sensor data generated by the inertial sensor;
a data checking module configured to receive a divergence score relative to a centroid value associated with the feature data and the previous centroid value;
a transceiver configured to transmit the batch of sensor data from the electronic device responsive to the divergence score;
a configuration register coupled to the arithmetic unit and configured to receive feature configuration data responsive to the transceiver transmitting the batch of sensor data, wherein:
the inertial sensor is configured to generate new sensor signal after the configuration register receives the feature configuration data,
the analog to digital converter is configured to generate new sensor data based on the new sensor signals; and
the arithmetic logic unit is configured to generate new feature data based on the new sensor data and including a second set of features different than the first set based on the feature configuration data.

5. The electronic device of claim 4, wherein the sensor unit includes labeling circuitry configured to label the sensor data.

6. The electronic device of claim 4, wherein the configuration register stores sensor configuration data for the inertial sensor.

7. The electronic device of claim 6, wherein the sensor configuration data includes:
data output rate settings;
full-scale settings;
feature settings;

filter settings; or combinations thereof.

8. The electronic device of claim 4, wherein the inertial sensor includes an accelerometer.

9. The electronic device of claim 4, wherein the inertial sensor includes a gyroscope.

10. A method, comprising:

receiving, with a staging buffer, inertial sensor data from an inertial sensor of a sensor unit of an electronic device;

receiving, with the staging buffer, configuration data of the sensor unit including operating parameters of the inertial sensor;

receiving, with the stage buffer from an arithmetic logic unit, feature data based on the inertial sensor data and the configuration data and including a plurality of features;

storing, in the staging buffer, the sensor data with a current batch of sensor data;

receiving a centroid value based on the feature data;

storing, in a centroid buffer, a previous centroid value associated with a previous batch of sensor data generated by the inertial sensor;

receiving a divergence score relative to the centroid value and the previous centroid value associated with previous feature data of the previous batch of sensor data;

transferring the sensor data from the staging buffer to a global buffer responsive to the divergence score;

generating, responsive to the divergence score, new configuration data including new operating parameters of the inertial sensor based on the sensor data;

transmitting, to the electronic device, the new configuration data responsive to the divergence score;

receiving with the staging buffer, new inertial sensor data from the inertial sensor of the sensor unit of the electronic device based on the new configuration data after transmitting the new configuration data; and receiving, with the staging buffer, new feature data based on the new inertial sensor data and the new configuration data.

11. The method of claim 10, wherein the inertial sensor includes one or more accelerometers.

12. The method of claim 10, wherein the inertial sensor includes one or more gyroscopes.

13. The method of claim 10, wherein the first set of features includes an average acceleration of the inertial sensor data.

14. The method of claim 10, wherein the first set of features includes a number of zero crossings of the inertial sensor data.

15. The method of claim 10, wherein the first set of features includes a peak-to-peak range of the inertial sensor data.

16. The method of claim 10, further comprising receiving, in the staging buffer, a plurality of performance matrices based on the feature data.

17. The method of claim 1, wherein the inertial sensor includes one or more accelerometers.

18. The method of claim 1, wherein the inertial sensor includes one or more gyroscopes.

19. The method of claim 1, wherein the features includes an average acceleration of the inertial sensor data.

20. The method of claim 1, wherein the features includes a number of zero crossings of the inertial sensor data.

* * * * *